US010205726B2

(12) United States Patent
Knapp et al.

(10) Patent No.: US 10,205,726 B2
(45) Date of Patent: Feb. 12, 2019

(54) APPARATUS AND METHOD FOR PREVENTING FILE ACCESS BY NODES OF A PROTECTED SYSTEM

(71) Applicant: Honeywell International Inc., Morris Plains, NJ (US)

(72) Inventors: Eric D. Knapp, Milton, NH (US); Eric T. Boice, Peoria, AZ (US)

(73) Assignee: Honeywell International Inc., Morris Plains, NJ (US)

(*) Notice: Subject to any disclaimer, the term of this patent is extended or adjusted under 35 U.S.C. 154(b) by 0 days.

(21) Appl. No.: 15/469,714

(22) Filed: Mar. 27, 2017

(65) Prior Publication Data

US 2017/0353460 A1 Dec. 7, 2017

Related U.S. Application Data

(60) Provisional application No. 62/345,601, filed on Jun. 3, 2016, provisional application No. 62/345,637, filed (Continued)

(51) Int. Cl.
*H04L 9/32* (2006.01)
*G06F 21/56* (2013.01)
(Continued)

(52) U.S. Cl.
CPC .............. *H04L 63/10* (2013.01); *G06F 21/56* (2013.01); *G06F 21/602* (2013.01);
(Continued)

(58) Field of Classification Search
CPC ..... H04L 63/10; H04L 9/3247; H04L 9/3236; H04L 63/107; H04L 63/20;
(Continued)

(56) References Cited

U.S. PATENT DOCUMENTS 7,010,647 B1* 3/2006 Karamchetty .......... G06F 21/78 711/102
7,464,219 B2* 12/2008 Hinrichs ................. G06F 21/78 711/112

(Continued)

FOREIGN PATENT DOCUMENTS

KR 10-2012-0060396 A 6/2012
KR 10-1349849 B1 1/2014
WO 2011148224 A1 12/2011

OTHER PUBLICATIONS

ISA/KR, International Search Report and Written Opinion of the International Searching Authority for Application No. PCT/US2017/033054, dated Aug. 10, 2017, 15 pages.

(Continued)

*Primary Examiner* — Michael Pyzocha

(57) ABSTRACT

A method includes detecting a storage device at a protected node and determining whether the storage device has been checked-in for use with at least the protected node. The method also includes granting access to the storage device in response to determining that the storage device has been checked-in for use with at least the protected node. The method further includes blocking access to the storage device in response to determining that the storage device has not been checked-in for use with at least the protected node. The method may also include determining whether a file on the storage device has been checked-in for use with at least the protected node. Meaningful access to the file is granted or blocked in response to determining that the file has or has not been checked-in for use with at least the protected node.

22 Claims, 9 Drawing Sheets

Related U.S. Application Data on Jun. 3, 2016, provisional application No. 62/345,683, filed on Jun. 3, 2016, provisional application No. 62/345,729, filed on Jun. 3, 2016, provisional application No. 62/345,731, filed on Jun. 3, 2016, provisional application No. 62/345,733, filed on Jun. 3, 2016, provisional application No. 62/345,735, filed on Jun. 3, 2016.

(51) Int. Cl.
*G06F 21/60* (2013.01)
*H04L 29/06* (2006.01)

(52) U.S. Cl.
CPC .......... *H04L 9/3236* (2013.01); *H04L 9/3247* (2013.01); *G06F 2221/034* (2013.01); *G06F 2221/2105* (2013.01)

(58) Field of Classification Search
CPC ... H04L 63/0428; G06F 21/56; G06F 21/602; G06F 2221/034; G06F 21/6218; H04W 12/08
See application file for complete search history.

(56) References Cited

U.S. PATENT DOCUMENTS

| | | | |
|---|---|---|---|
| 7,640,589 B1 | 12/2009 | Mashevsky et al. | |
| 9,129,138 B1* | 9/2015 | Hesselink | G06F 21/78 |
| 9,336,375 B1* | 5/2016 | Sharma | G06F 21/31 |
| 2001/0054042 A1* | 12/2001 | Watkins | G06F 17/30126 |
| 2004/0123127 A1* | 6/2004 | Teicher | G06F 21/78 |
| | | | 713/193 |
| 2005/0206353 A1* | 9/2005 | Sengoku | G06F 21/78 |
| | | | 323/210 |
| 2006/0004974 A1* | 1/2006 | Lin | G06F 21/6245 |
| | | | 711/164 |
| 2006/0230203 A1* | 10/2006 | Cheng | G06F 3/0605 |
| | | | 710/62 |
| 2007/0118757 A1* | 5/2007 | Skinner | G06F 21/79 |
| | | | 713/186 |
| 2007/0245108 A1* | 10/2007 | Yasaki | G06F 12/0844 |
| | | | 711/163 |
| 2008/0022360 A1* | 1/2008 | Bacastow | G06F 21/85 |
| | | | 726/1 |
| 2008/0083037 A1* | 4/2008 | Kruse | G06F 21/88 |
| | | | 726/27 |
| 2008/0235803 A1* | 9/2008 | Harada | G06F 21/57 |
| | | | 726/26 |
| 2008/0256076 A1* | 10/2008 | Claus | G06F 19/3406 |
| 2008/0320317 A1* | 12/2008 | Funahashi | G06F 21/32 |
| | | | 713/189 |
| 2009/0319782 A1 | 12/2009 | Lee | |
| 2010/0114825 A1* | 5/2010 | Siddegowda | G06F 8/71 |
| | | | 707/638 |
| 2010/0211792 A1* | 8/2010 | Ureche | H04L 9/3247 |
| | | | 713/176 |
| 2010/0293374 A1* | 11/2010 | Bushby | H04L 9/3231 |
| | | | 713/168 |
| 2011/0016298 A1* | 1/2011 | McCollom | G06F 21/57 |
| | | | 713/1 |
| 2012/0054862 A1 | 3/2012 | Jevans et al. | |
| 2012/0297205 A1* | 11/2012 | Yuen | G06F 21/31 |
| | | | 713/193 |
| 2013/0031376 A1* | 1/2013 | Rivera | G06F 21/78 |
| | | | 713/193 |
| 2013/0091575 A1* | 4/2013 | Duncan | G06F 21/567 |
| | | | 726/24 |
| 2013/0179940 A1 | 7/2013 | Krummel | |
| 2013/0227043 A1* | 8/2013 | Murakami | H04L 51/063 |
| | | | 709/206 |
| 2013/0291112 A1 | 10/2013 | Shue et al. | |
| 2013/0305028 A1* | 11/2013 | Mo | G06F 12/1408 |
| | | | 713/2 |
| 2014/0250521 A1* | 9/2014 | Gallardo | G06F 21/70 |
| | | | 726/16 |
| 2014/0256418 A1* | 9/2014 | Kleppen | G07F 17/3241 |
| | | | 463/29 |
| 2014/0310824 A1* | 10/2014 | Ma | G06F 21/6209 |
| | | | 726/30 |
| 2015/0180884 A1 | 6/2015 | Bhargava et al. | |
| 2016/0014111 A1* | 1/2016 | Kurz | G06F 21/44 |
| | | | 713/172 |
| 2016/0078224 A1 | 3/2016 | Jeansonne et al. | |
| 2016/0292173 A1* | 10/2016 | Hanes | G06F 17/30097 |
| 2016/0306966 A1* | 10/2016 | Srivastava | G06F 21/31 |
| 2017/0230365 A1* | 8/2017 | Poete | H04L 63/0876 |
| 2017/0323111 A1* | 11/2017 | Hernandez Gonzalez | G06F 21/6218 |

OTHER PUBLICATIONS

ISA/KR, International Search Report and Written Opinion of the International Searching Authority for Application No. PCT/US2017/033079, dated Aug. 11, 2017, 12 pages.

ISA/KR, International Search Report and Written Opinion of the International Searching Authority for Application No. PCT/US2017/033224, dated Aug. 14, 2017, 11 pages.

ISA/KR, International Search Report and Written Opinion of the International Searching Authority for Application No. PCT/US2017/033235, dated Aug. 7, 2017, 11 pages.

ISA/KR, International Search Report and Written Opinion of the International Searching Authority for Application No. PCT/US2017/033251, dated Aug. 10, 2017, 12 pages.

ISA/KR, International Search Report and Written Opinion of the International Searching Authority for Application No. PCT/US2017/033288, dated Aug. 7, 2017, 13 pages.

ISA/KR, International Search Report and Written Opinion of the International Searching Authority for Application No. PCT/US2017/033481, dated Aug. 25, 2017, 12 pages.

Blue Coat; "Blue Coat ICS Protection Scanner Station Version—USB Malware Defense for Industrial Computers—User Guide, version 5.3.1"; www.bluecoat.com; 2014; 16 pages.

* cited by examiner

APPARATUS AND METHOD FOR PREVENTING FILE ACCESS BY NODES OF A PROTECTED SYSTEM

CROSS-REFERENCE TO RELATED APPLICATIONS AND PRIORITY CLAIM

This application claims priority under 35 U.S.C. § 119(e) to the following U.S. provisional patent applications:

U.S. Provisional Patent Application No. 62/345,601 filed on Jun. 3, 2016 and entitled "SYSTEM AND METHOD FOR PROVIDING COMMAND AND CONTROL PARAMETERS, CONFIGURATION DATA, AND OTHER DATA TO NODES OF A PROTECTED SYSTEM USING SECURE MEDIA";

U.S. Provisional Patent Application No. 62/345,637 filed on Jun. 3, 2016 and entitled "SYSTEM AND METHOD FOR BRIDGING CYBER-SECURITY THREAT INTELLIGENCE INTO A PROTECTED SYSTEM USING SECURE MEDIA";

U.S. Provisional Patent Application No. 62/345,683 filed on Jun. 3, 2016 and entitled "SYSTEM AND METHOD FOR AUDITING FILE ACCESS TO SECURE MEDIA BY NODES OF A PROTECTED SYSTEM";

U.S. Provisional Patent Application No. 62/345,729 filed on Jun. 3, 2016 and entitled "APPARATUS AND METHOD FOR DEVICE WHITELISTING AND BLACKLISTING TO OVERRIDE PROTECTIONS FOR ALLOWED MEDIA AT NODES OF A PROTECTED SYSTEM";

U.S. Provisional Patent Application No. 62/345,731 filed on Jun. 3, 2016 and entitled "APPARATUS AND METHOD FOR LOCKING AND UNLOCKING REMOVABLE MEDIA FOR USE INSIDE AND OUTSIDE PROTECTED SYSTEMS";

U.S. Provisional Patent Application No. 62/345,733 filed on Jun. 3, 2016 and entitled "SYSTEM AND METHOD SUPPORTING SECURE DATA TRANSFER INTO AND OUT OF PROTECTED SYSTEMS USING REMOVABLE MEDIA"; and U.S. Provisional Patent Application No. 62/345,735 filed on Jun. 3, 2016 and entitled "APPARATUS AND METHOD FOR PREVENTING FILE ACCESS BY NODES OF A PROTECTED SYSTEM".

All of these provisional patent applications are hereby incorporated by reference in their entirety.

TECHNICAL FIELD

This disclosure relates generally to computing and network security. More specifically, this disclosure relates to an apparatus and method for preventing file access by nodes of a protected system.

BACKGROUND

Numerous organizations have private computing networks supporting some type of access controls or other cyber-security controls to limit network access. This is highly necessary in protected environments such as industrial control systems, manufacturing plants or other facilities, hospitals or other healthcare facilities, and classified network areas. The need to transfer information into and out of secure networks has led to the increased use of removable media, such as portable Universal Serial Bus (USB) drives. Removable media are often used to move information or files (such as application patches, diagnostics applications, or documentation) into or out of secure networks. Unfortunately, removable media provide a new vector for cyber-attacks into protected systems. In many instances, removable media represent one of the primary inbound vectors through which viruses and other malware can enter secure networks.

SUMMARY

This disclosure provides an apparatus and method for preventing file access by nodes of a protected system.

In a first embodiment, an apparatus includes at least one interface configured to be coupled to a storage device. The apparatus also includes at least one processing device configured to detect the storage device and determine whether the storage device has been checked-in for use with at least the apparatus. The at least one processing device is also configured to grant access to the storage device in response to determining that the storage device has been checked-in for use with at least the apparatus. The at least one processing device is further configured to block access to the storage device in response to determining that the storage device has not been checked-in for use with at least the apparatus.

In a second embodiment, a method includes detecting a storage device at a protected node and determining whether the storage device has been checked-in for use with at least the protected node. The method also includes granting access to the storage device in response to determining that the storage device has been checked-in for use with at least the protected node. The method further includes blocking access to the storage device in response to determining that the storage device has not been checked-in for use with at least the protected node.

In a third embodiment, a non-transitory computer readable medium contains instructions that, when executed by at least one processing device, cause the at least one processing device to detect a storage device at a protected node and determine whether the storage device has been checked-in for use with at least the protected node. The medium also contains instructions that, when executed by the at least one processing device, cause the at least one processing device to grant access to the storage device in response to determining that the storage device has been checked-in for use with at least the protected node. The medium further contains instructions that, when executed by the at least one processing device, cause the at least one processing device to block access to the storage device in response to determining that the storage device has not been checked-in for use with at least the protected node.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 13, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As described above, removable media such as portable Universal Serial Bus (USB) drives represent one of the primary inbound vectors through which viruses and other malware can enter secure networks. This disclosure provides techniques to control how files are moved into and out of a secure network using removable media. In particular, this disclosure describes how the use of a storage device (such as a USB drive or other removable media) is supported using "check-in" and "check-out" processes. When the storage device is "checked-in," the storage device can be used with protected nodes of a secure network but not with unprotected nodes. When the storage device is "checked-out," the storage device can be used with unprotected nodes but not with protected nodes of a secure network. By default, the storage device is considered checked-out until it undergoes the check-in procedure.

Figure 1:
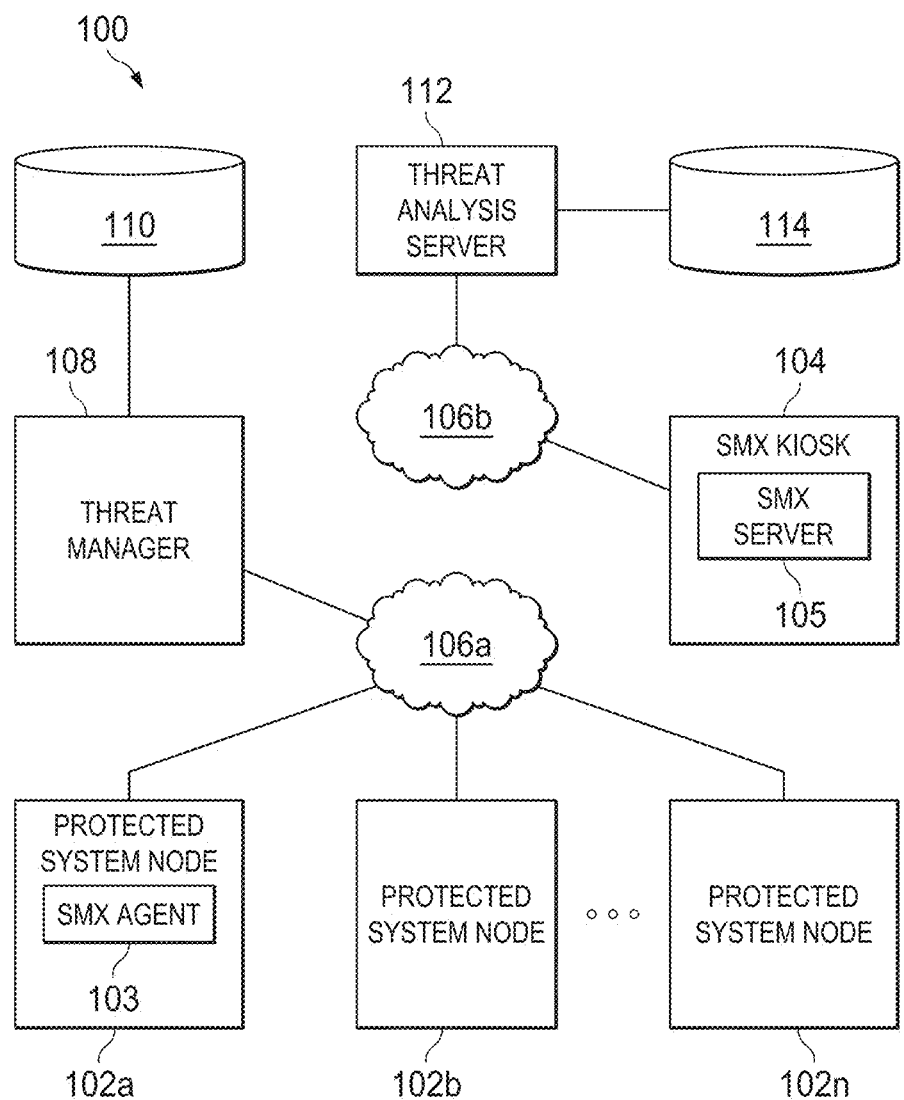
FIG. 1 illustrates an example system supporting secure data transfer using removable media according to this disclosure.

FIG. 1 illustrates an example system 100 supporting secure data transfer using removable media according to this disclosure. As shown in FIG. 1, the system 100 includes one or more protected system nodes 102a-102n. Each protected system node 102a-102n denotes a computing or networking device that forms a part of a protected system. Each protected system node 102a-102n could perform any desired function or functions within a protected system. For example, a protected system node 102a-102n could be used to perform functions related to industrial process control, such as functions for controlling manufacturing plants or other manufacturing facilities. A protected system node 102a-102n could also be used to store confidential data, such as in hospitals or other healthcare facilities or in classified network areas. Each protected system node 102a-102n includes any suitable computing or networking device that supports any desired function(s), such as a personal computer, laptop computer, or server computer running any suitable operating system.

Each protected system node 102a-102n in this example includes a SECURE MEDIA EXCHANGE or "SMX" agent 103. Each SMX agent 103 controls or manages the use of removable media with an associated protected system node 102a-102n. As described in more detail below, each SMX agent 103 can determine whether a storage device has been "checked-in" by examining contents of the storage device or the storage device itself. If the storage device has been checked-in, the SMX agent 103 allows the associated protected system node 102a-102n to access and use the storage device. If the storage device has not been checked-in, the SMX agent 103 blocks the use of the storage device by the associated protected system node 102a-102n. Various operations of the SMX agents 103 are also described below. Each SMX agent 103 could be implemented in any suitable manner, such as by using one or more software or firmware routines executed by the associated protected system node 102a-102n.

The system 100 also includes one or more SMX kiosks 104. Each SMX kiosk 104 is used to support the "check-in" and "check-out" processes for storage devices. For example, when a user plugs a USB drive or other storage device into a suitable interface of an SMX kiosk 104, the user could initiate a check-in procedure. Example functions of the check-in procedure could include the SMX kiosk 104 scanning any files on the storage device and determining whether viruses or other malware is present on the storage device. Example functions of the check-in procedure could also include the SMX kiosk 104 quarantining any detected malware, storing various data (such as digital signatures or audit logs) on the storage device, possibly encrypting clean files on the storage device, and locking a file system of the storage device. At this point, the storage device is considered checked-in and therefore "trusted," so the storage device could be used with one, some, or all of the protected system nodes 102a-102n but not with any untrusted nodes.

When a user plugs a checked-in USB drive or other storage device into a suitable interface of an SMX kiosk 104, the user could also initiate a check-out procedure. Example functions of the check-out procedure could include the SMX kiosk 104 scanning any new files on the storage device and determining whether viruses or other malware is present on the storage device. Example functions of the check-out procedure could also include the SMX kiosk 104 quarantining any detected malware, removing various data (such as digital signatures or audit logs) from the storage device, decrypting various encrypted elements on the storage device, and unlocking the file system of the storage device. At that point, the storage device is considered checked-out and therefore "untrusted," so the storage device could be used with untrusted nodes but not with the protected system nodes 102a-102n.

Each SMX kiosk 104 includes any suitable device or system for checking in and checking out removable media. Each SMX kiosk 104 could, for example, denote a desktop computer, laptop computer, server computer, or tablet computer having at least one interface for coupling to removable media. Each SMX kiosk 104 in this example includes an SMX server 105. Each SMX server 105 can perform the check-in and check-out procedures described above and in more detail below. Various operations of the SMX server 105 are also described below. Each SMX server 105 could be implemented in any suitable manner, such as by using one or more software or firmware routines executed by the associated SMX kiosk 104.

Collectively, the SMX agents 103 and the SMX servers 105 provide an innovative approach for helping to ensure that information stored on removable media is authorized, safe, and unaltered. For example, the SMX agents 103 prevent the normal operation of USB interfaces or other peripheral device interfaces of the protected system nodes 102a-102n that might be used to connect to a storage device unless the storage device is first authorized by one of the SMX servers 105. Once authorized, the storage device is made accessible to the protected system nodes 102a-102n through the SMX agents 103. Additionally, the SMX servers 105 can authorize individual files in order to allow safe files or file types to be brought into a protected system while blocking malicious or unwanted files or file types. This can again be enforced by the SMX agents 103, which block unauthorized files or file types at the protected system nodes 102a-102n.

The system 100 uses the "check-in" and "check-out" mechanisms to authorize removable media or specific files or file types on the removable media. An end user wishing to use a storage device in a protected system first allows an SMX server 105 to scan and authorize the storage device, at which point the storage device is locked to prevent other uses of the storage device. Once locked, the storage device is only useable on protected system nodes 102a-102n having appropriately configured and authorized SMX agents 103. When the user is finished with his or her task, the storage device can be checked-out using an SMX server 105, restoring the storage device to its normal functionality and preventing use of the storage device with the protected system nodes 102a-102n.

The check-in and check-out mechanisms of the SMX servers 105 and the operations of the SMX agents 103 are able to maintain an audit trail of file transfers to and from a storage device. The check-in and check-out mechanisms of the SMX servers 105 and the operations of the SMX agents 103 are also able to pass configuration parameters, event logs, or other data between protected system nodes 102a-102n and an unprotected network without violating the tenants of a "zone and conduit" model of cyber-security, meaning there is no direct network connection between the protected and unprotected networks. One example of configuration parameters that might be passed to the SMX agents 103 on the protected system nodes 102a-102n includes whitelists and blacklists of files, file types, or media types that the SMX agents 103 will or will not grant access to, bypassing normal protective behaviors.

Note that the SMX servers 105 can use a variety of malware detection methods or work in conjunction with a variety of malware detection software packages. Also note that the SMX servers 105 could receive administrator input to control how the SMX servers 105 decide which files, file types, or media types are authorized for use within a protected system. In general, any suitable techniques could be used for identifying files, file types, or media types to which the SMX agents 103 allow access.

In this example, multiple networks 106a-106b are present in the system 100. The network 106a supports communications between the protected system nodes 102a-102n, while the network 106b supports communications to and from the SMX kiosks 104. The use of different networks 106a-106b here allows the SMX kiosks 104 to reside outside of a protected system (formed by at least the protected system nodes 102a-102n and the network 106a). However, the protected system nodes 102a-102n and the SMX kiosks 104 could alternatively communicate over the same network(s). Each network 106a-106b includes any suitable network or combination of networks.

The system 100 also optionally includes at least one security manager 108 and at least one database 110 used by or otherwise associated with the security manager(s) 108. Each security manager 108 denotes a system supporting the analysis of cyber-security data from information sources such as the SMX agents 103 or the SMX servers 105. For example, a security manager 108 could analyze threat intelligence data and audit logs generated and supported by the SMX agents 103 or other sources connected to the network 106a. Note that each security manager 108 could be connected to the network 106a or to the network 106b but not both, since the network 106a may need to remain isolated from the network 106b. The data from the SMX agents 103 could be obtained directly from the SMX agents 103 or indirectly, such as via storage devices that physically transport data from the SMX servers 105 or other components coupled to the network 106b into the network 106a. The ability to transport data to the security manager 108 indirectly may allow a wide range of data to be securely provided into a protected network.

The security manager 108 analyzes the collected data (possibly including data from an unprotected network that might otherwise be unobtainable) to generate indicators identifying various cyber-security threats in the system 100. The collected threat intelligence data, audit logs, or other information could be stored in the database 110. Each security manager 108 includes any suitable structure used for analyzing cyber security-related data, such as threat data, vulnerability data, network statistics, diagnostics, maintenance information, and performance data. As a particular example, each security manager 108 could denote a HONEYWELL RISK MANAGER. Each database 110 includes any suitable structure for storing and retrieving data.

The system 100 further optionally includes at least one threat analysis server 112 and at least one database 114 used by or otherwise associated with the threat analysis server(s) 112. Each threat analysis server 112 denotes a system supporting the analysis of data to identify threats associated with the system 100. For example, a threat analysis server 112 could denote a cloud-based or other computing platform that supports sandboxing, code analysis, reputation analysis, and behavioral analysis in order to identify new forms of malware. When an SMX server 105 is unable to determine whether code on a storage device includes malware, the SMX server 105 could provide the code to the threat analysis server 112 for evaluation. If a user or the threat analysis server 112 determines that the code is malicious, the threat analysis server 112 can update the SMX servers 105 with new threat information. The threat analysis server 112 could also obtain information identifying new cyber-security threats (such as new malware signatures) from other sources and provide the threat information to the SMX servers 105. The threat analysis server 112 could further obtain information defining cyber-security threats identified by some of the SMX servers 105 and provide that information to others of the SMX servers 105. As a result, the overall system can "learn" about new threats over time and adapt accordingly. Ideally, the SMX servers 105 are updated over time to accumulate intelligence regarding both known and unknown (zero-day) attacks.

The database 114 is used to store various information about cyber-security threats or other aspects of the system 100. For example, the database 114 could be used to store information about known cyber-security attacks, industries and systems currently targeted by cyber-security attacks, and indicators that a device or system has been compromised. The database 114 could also be used to store information about threat patterns and advanced threat campaigns. The database 114 could further be used to store audit logs or other information collected from the SMX kiosks 104. Each database 114 includes any suitable structure for storing and retrieving data.

Note that while the threat analysis server 112 and database 114 are shown here as forming part of the system, these components could reside outside of and be used in conjunction with the system 100. This may allow operations of the threat analysis server 112 to be provided as a service to a number of users in the same organization or in multiple organizations. As a particular example, the threat analysis server 112 could be used to generate detailed threat reports as a service to the operator of the system 100 and to operators of other protected systems.

Additional details regarding the operations of the SMX agents 103 and the SMX servers 105 are provided below. The SMX agents 103 and the SMX servers 105 could be used in any suitable system where at least one protected system node 102a-102n exists. As noted above, these can include industrial control systems, manufacturing plants or other facilities, hospitals or other healthcare facilities, and classified network areas.

Although FIG. 1 illustrates one example of a system 100 supporting secure data transfer using removable media, various changes may be made to FIG. 1. For example, the system 100 could include any number of protected system nodes, SMX kiosks, networks, security managers, threat analysis servers, databases, and other components.

Figure 2:
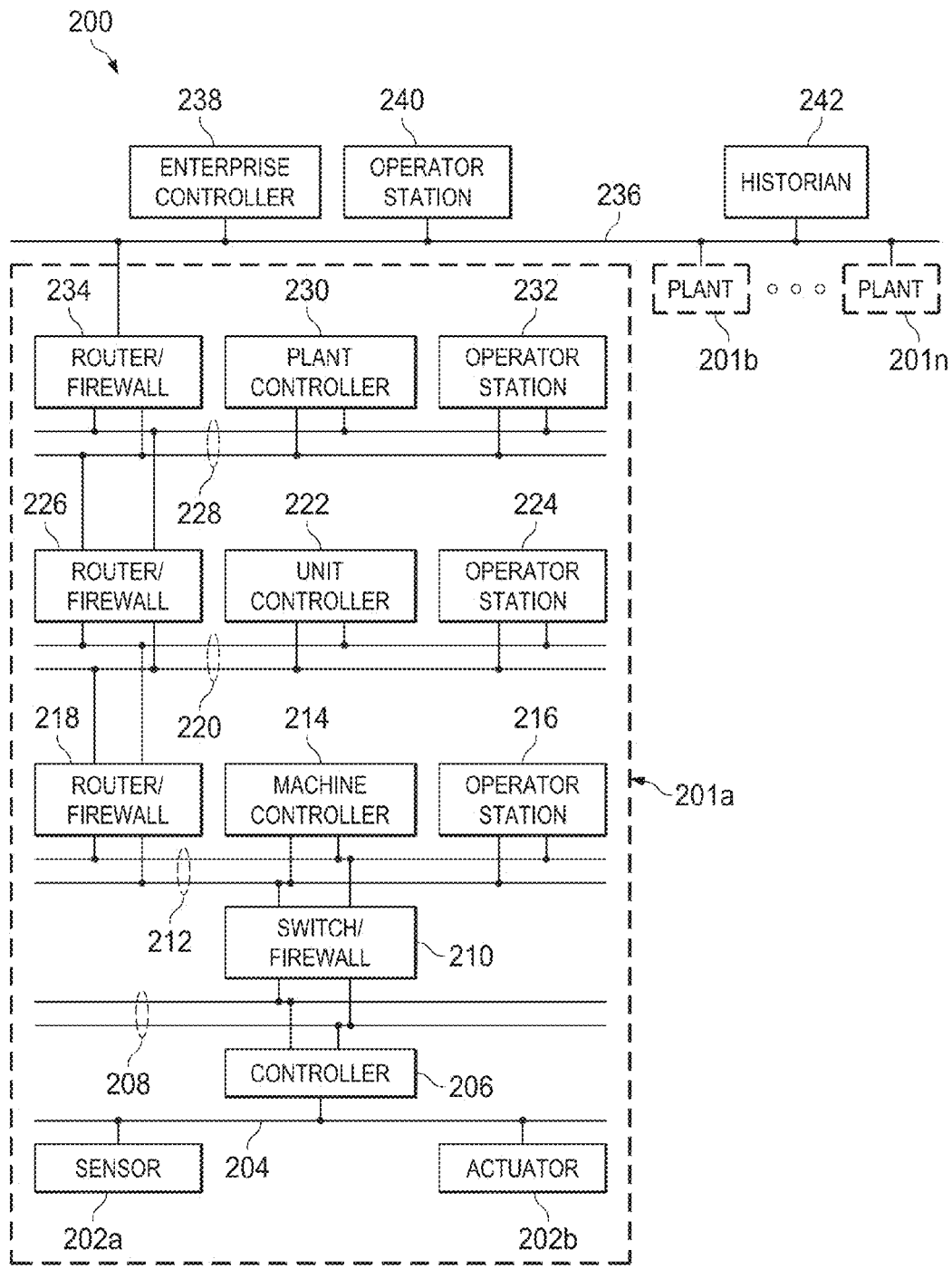
FIG. 2 illustrates an example industrial process control and automation system in which removable media could be used according to this disclosure.

FIG. 2 illustrates an example industrial process control and automation system 200 in which removable media could be used according to this disclosure. The control and automation system 200 denotes one example type of system where the SMX agents 103 and the SMX servers 105 described above could be implemented.

As shown in FIG. 2, the system 200 includes various components that facilitate production or processing of at least one product or other material. For instance, the system 200 is used here to facilitate control over components in one or multiple plants 201a-201n. Each plant 201a-201n represents one or more processing facilities (or one or more portions thereof), such as one or more manufacturing facilities for producing at least one product or other material. In general, each plant 201a-201n may implement one or more processes and can individually or collectively be referred to as a process system. A process system generally represents any system or portion thereof configured to process one or more products or other materials in some manner.

In FIG. 2, the system 200 is implemented using the Purdue model of process control. In the Purdue model, "Level 0" may include one or more sensors 202a and one or more actuators 202b. The sensors 202a and actuators 202b represent components in a process system that may perform any of a wide variety of functions. For example, the sensors 202a could measure a wide variety of characteristics in the process system, such as temperature, pressure, or flow rate. Also, the actuators 202b could alter a wide variety of characteristics in the process system. The sensors 202a and actuators 202b could represent any other or additional components in any suitable process system. Each of the sensors 202a includes any suitable structure for measuring one or more characteristics in a process system. Each of the actuators 202b includes any suitable structure for operating on or affecting one or more conditions in a process system.

One or more networks 204 are coupled to the sensors 202a and actuators 202b. The network 204 facilitates interaction with the sensors 202a and actuators 202b. For example, the network 204 could transport measurement data from the sensors 202a and provide control signals to the actuators 202b. The network 204 could represent any suitable network or combination of networks. As particular examples, the network 204 could represent an Ethernet network, an electrical signal network (such as a HART or FOUNDATION FIELDBUS network), a pneumatic control signal network, or any other or additional type(s) of network(s).

In the Purdue model, "Level 1" includes one or more controllers 206, which are coupled to the network 204. Among other things, each controller 206 may use the measurements from one or more sensors 202a to control the operation of one or more actuators 202b. Each controller 206 includes any suitable structure for controlling one or more aspects of a process system. As a particular example, each controller 206 could represent a computing device running a real-time operating system.

Redundant networks 208 are coupled to the controllers 206. The networks 208 facilitate interaction with the controllers 206, such as by transporting data to and from the controllers 206. The networks 208 could represent any suitable redundant networks. As particular examples, the networks 208 could represent a pair of Ethernet networks or a redundant pair of Ethernet networks, such as a FAULT TOLERANT ETHERNET (FTE) network from HONEYWELL INTERNATIONAL INC.

At least one switch/firewall 210 couples the networks 208 to two networks 212. The switch/firewall 210 may transport traffic from one network to another network. The switch/firewall 210 may also block traffic on one network from reaching another network. The switch/firewall 210 includes any suitable structure for providing communication between networks, such as a HONEYWELL CONTROL FIREWALL (CF9) device. The networks 212 could represent any suitable networks, such as a pair of Ethernet networks or an FTE network.

In the Purdue model, "Level 2" may include one or more machine-level controllers 214 coupled to the networks 212. The machine-level controllers 214 perform various functions to support the operation and control of the controllers 206, sensors 202a, and actuators 202b, which could be associated with a particular piece of industrial equipment (such as a boiler or other machine). For example, the machine-level controllers 214 could log information collected or generated by the controllers 206, such as measurement data from the sensors 202a or control signals for the actuators 202b. The machine-level controllers 214 could also execute applications that control the operation of the controllers 206, thereby controlling the operation of the actuators 202b. In addition, the machine-level controllers 214 could provide secure access to the controllers 206. Each of the machine-level controllers 214 includes any suitable structure for providing access to, control of, or operations related to a machine or other individual piece of equipment. Each of the machine-level controllers 214 could, for example, represent a server computing device running a MICROSOFT WINDOWS operating system. Although not shown, different machine-level controllers 214 could be used to control different pieces of equipment in a process system (where each piece of equipment is associated with one or more controllers 206, sensors 202a, and actuators 202b).

One or more operator stations 216 are coupled to the networks 212. The operator stations 216 represent computing or communication devices providing user access to the machine-level controllers 214, which could then provide user access to the controllers 206 (and possibly the sensors 202a and actuators 202b). As particular examples, the operator stations 216 could allow users to review the operational history of the sensors 202a and actuators 202b using information collected by the controllers 206 and/or the machine-level controllers 214. The operator stations 216 could also allow the users to adjust the operation of the sensors 202a, actuators 202b, controllers 206, or machine-level controllers 214. In addition, the operator stations 216 could receive and display warnings, alerts, or other messages or displays generated by the controllers 206 or the machine-level controllers 214. Each of the operator stations 216 includes any suitable structure for supporting user access and control of one or more components in the system 200. Each of the operator stations 216 could, for example, represent a computing device running a MICROSOFT WINDOWS operating system.

At least one router/firewall 218 couples the networks 212 to two networks 220. The router/firewall 218 includes any suitable structure for providing communication between networks, such as a secure router or combination router/firewall. The networks 220 could represent any suitable networks, such as a pair of Ethernet networks or an FTE network.

In the Purdue model, "Level 3" may include one or more unit-level controllers 222 coupled to the networks 220. Each unit-level controller 222 is typically associated with a unit in a process system, which represents a collection of different machines operating together to implement at least part of a process. The unit-level controllers 222 perform various functions to support the operation and control of components in the lower levels. For example, the unit-level controllers 222 could log information collected or generated by the components in the lower levels, execute applications that control the components in the lower levels, and provide secure access to the components in the lower levels. Each of the unit-level controllers 222 includes any suitable structure for providing access to, control of, or operations related to one or more machines or other pieces of equipment in a process unit. Each of the unit-level controllers 222 could, for example, represent a server computing device running a MICROSOFT WINDOWS operating system. Although not shown, different unit-level controllers 222 could be used to control different units in a process system (where each unit is associated with one or more machine-level controllers 214, controllers 206, sensors 202a, and actuators 202b).

Access to the unit-level controllers 222 may be provided by one or more operator stations 224. Each of the operator stations 224 includes any suitable structure for supporting user access and control of one or more components in the system 200. Each of the operator stations 224 could, for example, represent a computing device running a MICROSOFT WINDOWS operating system.

At least one router/firewall 226 couples the networks 220 to two networks 228. The router/firewall 226 includes any suitable structure for providing communication between networks, such as a secure router or combination router/firewall. The networks 228 could represent any suitable networks, such as a pair of Ethernet networks or an FTE network.

In the Purdue model, "Level 4" may include one or more plant-level controllers 230 coupled to the networks 228. Each plant-level controller 230 is typically associated with one of the plants 201a-201n, which may include one or more process units that implement the same, similar, or different processes. The plant-level controllers 230 perform various functions to support the operation and control of components in the lower levels. As particular examples, the plant-level controller 230 could execute one or more manufacturing execution system (MES) applications, scheduling applications, or other or additional plant or process control applications. Each of the plant-level controllers 230 includes any suitable structure for providing access to, control of, or operations related to one or more process units in a process plant. Each of the plant-level controllers 230 could, for example, represent a server computing device running a MICROSOFT WINDOWS operating system.

Access to the plant-level controllers 230 may be provided by one or more operator stations 232. Each of the operator stations 232 includes any suitable structure for supporting user access and control of one or more components in the system 200. Each of the operator stations 232 could, for example, represent a computing device running a MICROSOFT WINDOWS operating system.

At least one router/firewall 234 couples the networks 228 to one or more networks 236. The router/firewall 234 includes any suitable structure for providing communication between networks, such as a secure router or combination router/firewall. The network 236 could represent any suitable network, such as an enterprise-wide Ethernet or other network or all or a portion of a larger network (such as the Internet).

In the Purdue model, "Level 5" may include one or more enterprise-level controllers 238 coupled to the network 236. Each enterprise-level controller 238 is typically able to perform planning operations for multiple plants 201a-201n and to control various aspects of the plants 201a-201n. The enterprise-level controllers 238 can also perform various functions to support the operation and control of components in the plants 201a-201n. As particular examples, the enterprise-level controller 238 could execute one or more order processing applications, enterprise resource planning (ERP) applications, advanced planning and scheduling (APS) applications, or any other or additional enterprise control applications. Each of the enterprise-level controllers 238 includes any suitable structure for providing access to, control of, or operations related to the control of one or more plants. Each of the enterprise-level controllers 238 could, for example, represent a server computing device running a MICROSOFT WINDOWS operating system. In this document, the term "enterprise" refers to an organization having one or more plants or other processing facilities to be managed. Note that if a single plant 201a is to be managed, the functionality of the enterprise-level controller 238 could be incorporated into the plant-level controller 230.

Access to the enterprise-level controllers 238 may be provided by one or more operator stations 240. Each of the operator stations 240 includes any suitable structure for supporting user access and control of one or more components in the system 200. Each of the operator stations 240 could, for example, represent a computing device running a MICROSOFT WINDOWS operating system.

A historian 242 is also coupled to the network 236 in this example. The historian 242 could represent a component that stores various information about the system 200. The historian 242 could, for example, store information used during production scheduling and optimization. The historian 242 represents any suitable structure for storing and facilitating retrieval of information. Although shown as a single centralized component coupled to the network 236, the historian 242 could be located elsewhere in the system 200, or multiple historians could be distributed in different locations in the system 200.

In some embodiments, various components in or below "Level 3" in the system 200 could denote protected system nodes that execute the SMX agents 103 described above. Also, one or more SMX servers 105 could be implemented in the system 200, such as at "Level 4" or higher in the system 200. As a result, the use of removable media with those components could be restricted as described above. Through the use of the SMX agents 103 and the SMX servers 105, industrial control system or "ICS" attacks initiated through the use of removable media could be significantly reduced. In particular embodiments, various components in the system 200 could denote ICS cyber-security-specific monitoring and analytics systems, such as HONEYWELL RISK MANAGER, which might interact with SMX agents 103 to detect potential risk indicators leading to a cyber-security threat.

Although FIG. 2 illustrates one example of an industrial process control and automation system 200 in which removable media could be used, various changes may be made to FIG. 2. For example, industrial control and automation systems come in a wide variety of configurations. The system 200 shown in FIG. 2 is meant to illustrate one example operational environment in which certain functionalities can be used. However, FIG. 2 does not limit this disclosure to any particular configuration or operational environment.

Figure 3:
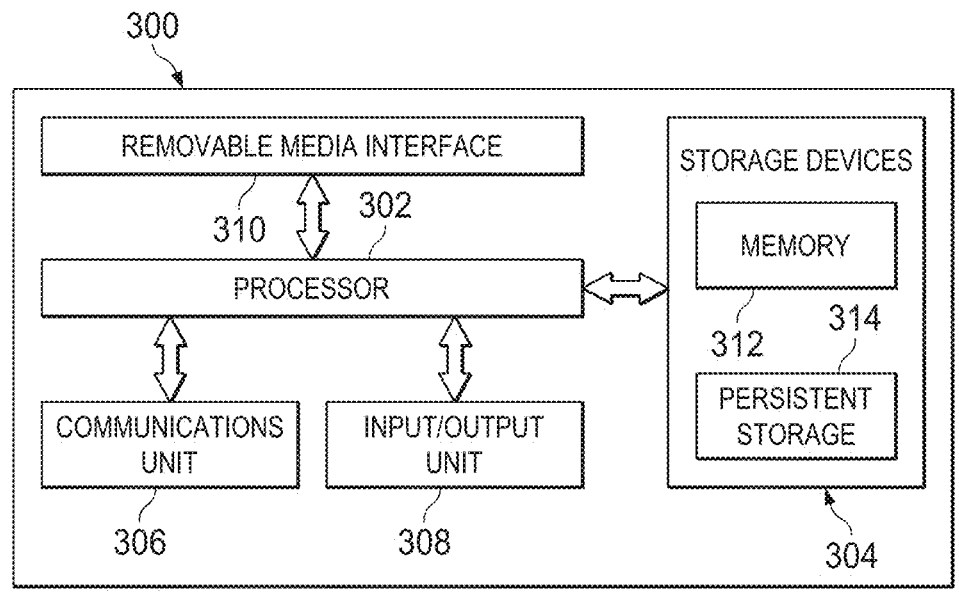
FIG. 3 illustrates an example device supporting secure data transfer using removable media according to this disclosure.

FIG. 3 illustrates an example device 300 supporting secure data transfer using removable media according to this disclosure. For example, the device 300 shown in FIG. 3 could denote any of the protected system nodes 102a-102n or any of the SMX kiosks 104 described above with respect to the system 100 of FIG. 1. The device 300 shown in FIG. 3 could also denote any of the protected devices described above with respect to the system 200 of FIG. 2.

As shown in FIG. 3, the device 300 includes at least one processor 302, at least one storage device 304, at least one communications unit 306, at least one input/output (I/O) unit 308, and at least one removable media interface 310. Each processor 302 can execute instructions, such as those that may be loaded into a memory 312. Each processor 302 denotes any suitable processing device, such as one or more microprocessors, microcontrollers, digital signal processors, application specific integrated circuits (ASICs), field programmable gate arrays (FPGAs), or discrete circuitry.

The memory 312 and a persistent storage 314 are examples of storage devices 304, which represent any structure(s) capable of storing and facilitating retrieval of information (such as data, program code, and/or other suitable information on a temporary or permanent basis). The memory 312 may represent a random access memory or any other suitable volatile or non-volatile storage device(s). The persistent storage 314 may contain one or more components or devices supporting longer-term storage of data, such as a read only memory, hard drive, Flash memory, or optical disc.

The communications unit 306 supports communications with other systems or devices. For example, the communications unit 306 could include a network interface card or a wireless transceiver facilitating communications over a wired or wireless network (such as the network 106b). The communications unit 306 may support communications through any suitable physical or wireless communication link(s).

The I/O unit 308 allows for input and output of data. For example, the I/O unit 308 may provide a connection for user input through a keyboard, mouse, keypad, touchscreen, or other suitable input device. The I/O unit 308 may also send output to a display, printer, or other suitable output device.

Each removable media interface 310 denotes a structure to which a storage device can be coupled. For example, the device 300 could include one or more USB slots, Secure Digital High Capacity (SDHC) or other Flash memory slots, or other interfaces for coupling to storage devices. Depending on the implementation, the device 300 could include a single removable media interface 310 or multiple removable media interfaces 310 of the same type or of different types.

When the device 300 implements an SMX kiosk 104, the processor(s) 302 can execute instructions implementing the SMX server 105. For example, when a storage device is inserted into or otherwise coupled to a removable media interface 310, the processor(s) 302 could execute instructions for checking-in or checking-out the storage device. The processor(s) 302 could also execute instructions for interacting with a security manager 108, threat analysis server 112, or other external system.

When the device 300 implements a protected system node 102a-102n or other protected device, the processor(s) 302 can execute instructions implementing the SMX agent 103. For example, when a storage device is inserted into or otherwise coupled to a removable media interface 310, the processor(s) 302 could execute instructions for determining whether the storage device has been checked-in. If so, the processor(s) 302 could execute instructions allowing the storage device to be accessed and used. If not, the processor(s) 302 could execute instructions blocking use of the storage device.

Although FIG. 3 illustrates one example of a device 300 supporting secure data transfer using removable media, various changes may be made to FIG. 3. For example, various components in FIG. 3 could be combined, further subdivided, or omitted and additional components could be added according to particular needs. Also, computing devices can come in a wide variety of configurations, and FIG. 3 does not limit this disclosure to any particular configuration of computing device.

FIGS. 4 through 7B illustrate examples of handling removable media to support secure data transfer into and out of protected systems according to this disclosure. For ease of explanation, the processes shown in FIGS. 4 through 7B are described with respect to the system 100 of FIG. 1. However, the processes shown in FIGS. 4 through 7B could be used in any other suitable system, such as the system 200 of FIG. 2.

Figure 4:
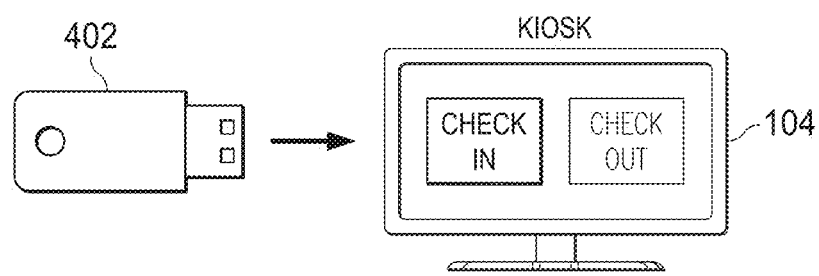
FIGS. 4 through 7B illustrate examples of handling removable media to support secure data transfer into and out of protected systems according to this disclosure.

As shown in FIG. 4, a storage device 402 is inserted into a slot of or otherwise coupled to an SMX kiosk 104, and a check-in process can be selected on a display of the SMX kiosk 104 (or using another input mechanism). The SMX server 105 of the SMX kiosk 104 then performs the check-in procedure. The check-in procedure could include functions such as scanning the storage device 402 for malware, digitally signing and possibly encrypting clean files on the storage device 402, and quarantining any files identified as having malware on the storage device 402 (where the quarantined files are not signed or encrypted). The check-in procedure could also include functions such as authorizing the storage device 402 for connectivity (such as by digitally signing the storage device 402 itself) and locking the file system of the storage device 402 so that only SMX agents 103 can access the storage device 402 (to prevent use outside of a protected system). The check-in procedure could further include functions such as creating a file manifest to contain scan results, activity logs, messages, and other information relevant to the operation of the system 100.

The check-in procedure could also optionally include adding one or more configuration parameters or other data to the storage device 402, such as within the file manifest. This data can be stored in an encrypted and signed configuration file or other file. The configuration parameters or other data can be used to update SMX agents 103 as described below. In addition, the results of the malware scan, a timestamp, an active user, configuration options, or other information can be stored on the storage device 402 in an encrypted and signed auditing file (called an audit log), and the audit log could be reported to a security manager 108 or threat analysis server 112.

Note that the scanning of files and the determination of which files are considered "clean" could be done in any suitable manner, such as by using a third-party anti-virus or anti-malware software package, pre-defined configuration files, or manual configurations. Moreover, the scanning and determination could include not only scanning the files on the storage device 402 but also identifying the type of storage device 402 itself and determining whether the storage device 402 is an allowed type of peripheral device. Further, the storage device 402 itself and individual files on the storage device 402 could be signed in any suitable manner. For instance, an SMX server 105 could digitally sign the storage device 402 itself by storing a hash on the storage device 402, and the SMX server 105 could digitally sign each file by storing a hash for each file on the storage device 402, potentially within the file manifest. Strong hash generation algorithms could be used in order to prevent reverse engineering or "cracking" of hash signatures. Files that are not authorized are not signed, such as when there is no hash provided for that file. In addition, the file system of the storage device 402 could be locked in any suitable manner, such as by altering key components of the file system using any suitable encryption method and a locally-stored certificate or private key.

Figure 5A:
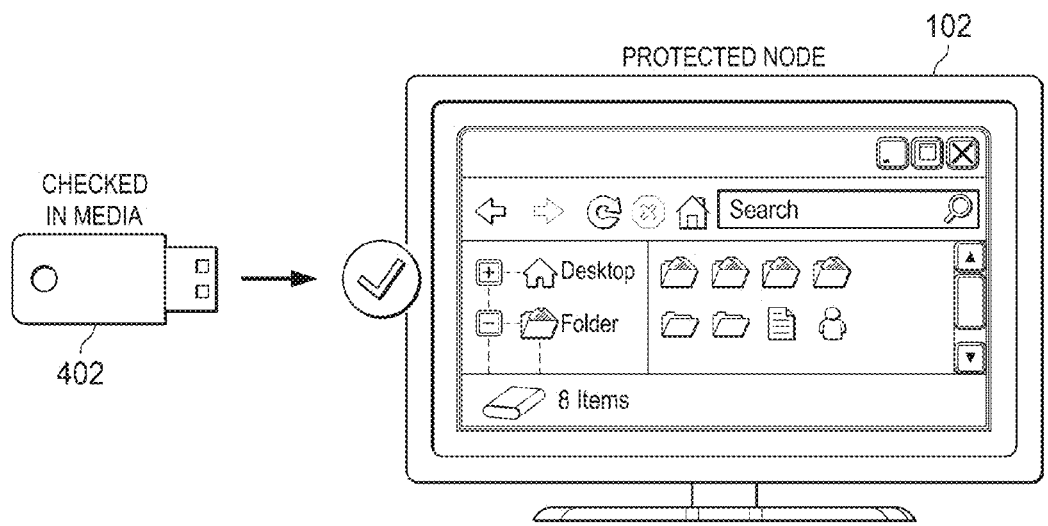
Figure 5B:
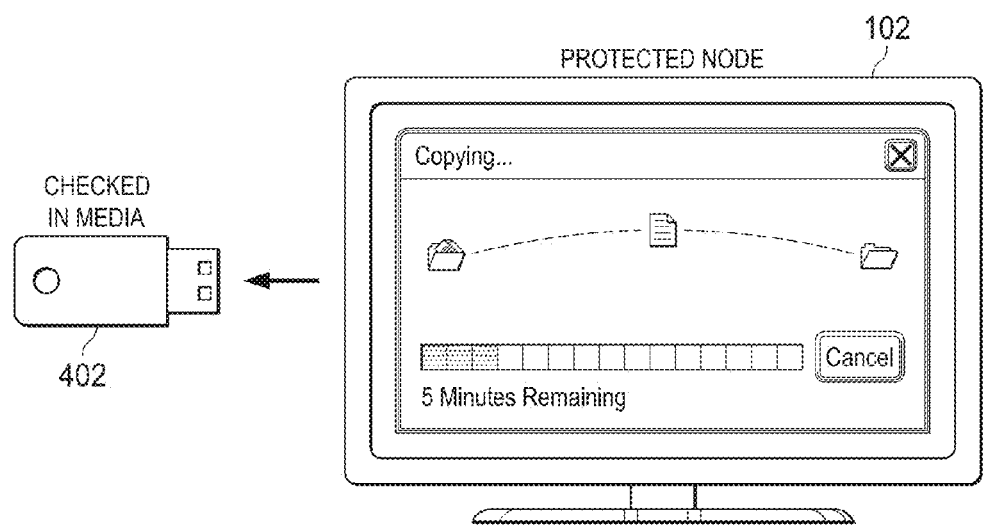

As shown in FIGS. 5A and 5B, a "checked-in" storage device 402 can be used with a protected system node 102. For example, the SMX agent 103 on the protected system node 102 could be configured with the appropriate security certificate(s) and parameter(s) that allow the SMX agent 103 to validate signed storage devices and files, possibly decrypt encrypted files, access a storage device's altered file system, read encrypted configuration parameters or other data if present, and read and write to one or more encrypted audit logs if present. Data can be transferred here from the storage device 402 onto the protected node 102 and/or from the protected node 102 onto the storage device 402.

In some embodiments, an SMX agent 103 can operate as a kernel-level driver or in kernel mode so that the SMX agent 103 allows access to a protected node's file system only upon validation and possibly decryption of certain files or elements. The SMX agent 103 could therefore intercept attempts to connect a storage device 402 at the driver level. The SMX agent 103 intercepts a connection attempt and (among other things) checks the signature or file system of the storage device 402. If the storage device 402 is allowed (checked-in), it has been digitally signed, utilizes a modified file system structure, and may include a compatible file manifest. An SMX agent 103 is able to read the file systems of storage devices 402 that are checked-in by SMX servers 105, and the SMX agent 103 is able to validate the digital signatures of authorized storage devices 402 (such as by using a shared certificate or private key).

Once a storage device 402 is validated, the SMX agent 103 analyzes each file against a unique digital signature (such as a hash) that is provided for that file by the SMX server 105, which is validated using a shared certificate or private key. If the storage device 402 and a file are successfully validated, the file is freely accessible by the local file system of the protected node 102 (so it can be copied from the removable storage device 402 to the local file system). If the storage device 402 or a file is not successfully validated, the storage device 402 or the file is blocked by the SMX agent 103 and not made accessible for any meaningful access to the local file system of the protected node 102.

During this time, the audit log(s) on the storage device 402 can be updated by the SMX agent 103 to identify the user and the types of operations attempted or performed using the storage device 402. Note that "meaningful" access here includes read, write, or delete access for a stream, file, directory, or volume (which can be prevented when the device 402 is not checked-in). Other functions could still be allowed when the device 402 is not checked-in, such as those that may be required by an operating system or those with little or no risk (such as querying or changing standard attributes, performing directory enumerations, or accessing USB power systems for device charging).

This helps to prevent unauthorized storage devices and files from being used in a system. Files from a storage device 402 can be copied onto a protected system node 102 and files from the protected system node 102 can be copied onto the storage device 402 only after the storage device 402 has been checked-in and examined.

Figure 6:
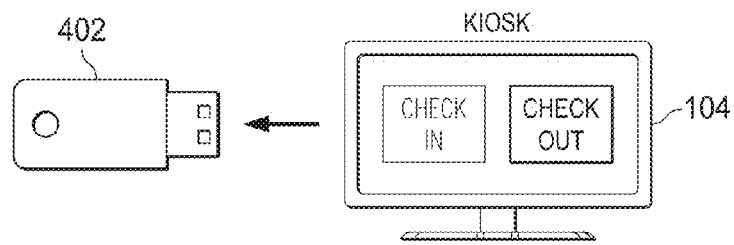

As shown in FIG. 6, the storage device 402 is inserted into a slot of or otherwise coupled to an SMX kiosk 104, and a check-out process can be selected on a display of the SMX kiosk 104 (or using another input mechanism). The SMX server 105 of the SMX kiosk 104 then performs the check-out procedure. The check-out procedure could include functions such as scanning the storage device 402 for malware in any new files (to stop outbound infection) and unlocking the file system of the storage device 402 so the storage device 402 can be used outside a protected system. The check-out procedure could also include functions such as deauthorizing the storage device 402 for connectivity and copying and removing all digital signatures, configuration parameters, log files, or file manifests on the storage device 402.

A checked-out storage device 402 has reverted to its original state, meaning digital signatures have been removed, encrypted elements have been decrypted, the normal file system operation has been restored, and configuration files have been removed. Audit log files on the storage device 402 can be collected by the SMX server 105 during the check-out process and then removed from the storage device 402. Note that any new files copied onto the storage device 402 while checked-in may or may not remain on the storage device 402 depending on the configuration of the system.

Because an SMX agent 103 can operate in kernel mode on a protected node 102, the SMX agent 103 can be aware of all files copied to or from a storage device 402. The SMX agent 103 can also be aware of all file activity that is blocked, such as due to the presence of unauthorized files (like malware) or attempts to save files from a protected node 102 onto the storage device 402. The SMX agent 103 can similarly be aware when an unauthorized storage device is connected to a protected node 102, and the attempt can be logged in a local encrypted log file on the protected node 102.

The SMX agent 103 can save information related to all of these events or other events in an audit log file on an authorized storage device 402. For example, when an authorized storage device 402 is connected to a protected node 102, any or all available log files stored locally on the protected node 102 could be copied to the authorized storage device 402. If a file is copied from the authorized storage device 402 to the protected node 102, the SMX agent 103 can append details of the file activity to the log file on the storage device 402. If a file is copied to the storage device 402 from the protected node 102, the SMX agent 103 can again append details of the file activity to the log file on the storage device 402. If an attempted file transfer to or from the storage device 402 is blocked by the SMX agent 103, the SMX agent 103 can append details of the file activity to the log file on the storage device 402.

Any suitable information could be included in an audit log file, either on a protected node 102 or on a storage device 402. Example details that may be included in the audit log file for a file activity could include a source node or device identifier, a target node or device identifier, parameters of the source and target nodes like Internet Protocol (IP) address and Medium Access Control (MAC) address, file name, file size, file type, file permissions, active user, and whether the file activity was allowed, blocked, or successful. Note, however, that any other or additional information could be stored in an audit log file as needed or desired. The audit log file can be encrypted, such as by using a certificate or locally-stored private key.

When a storage device 402 with an audit log file connects to an SMX server 105 (such as for check-out), the SMX server 105 can copy the audit log file from the storage device 402 (such as to a local log store on the SMX server 105). The file can be decrypted, such as by using a locally-stored certificate or private key, and made accessible to the SMX server 105 or other tool. Audit logs could be used in various ways, such as by generating audit reports or passing audit information to other systems like a security manager 108 or threat analysis server 112.

Support for the use of audit logs on storage devices 402 allows, among other things, the overall system to track which files are introduced to which protected nodes within a protected system via removable media. The details contained in an audit log could include pertinent details of file input/output (I/O), such as the active user, date, time, source file, and target system information related to a file transfer. Conventional local file system logs available on a target node typically lack information about file authorization or integrity and are unavailable to management or monitoring systems that reside outside of a protected system. Since audit logs on storage devices 402 can be retrieved and forwarded by SMX servers 105, the SMX agents 103 and the SMX servers 105 can collect a large amount of information useful for more effective auditing of the use of removable media in a protected system.

Figure 7A:
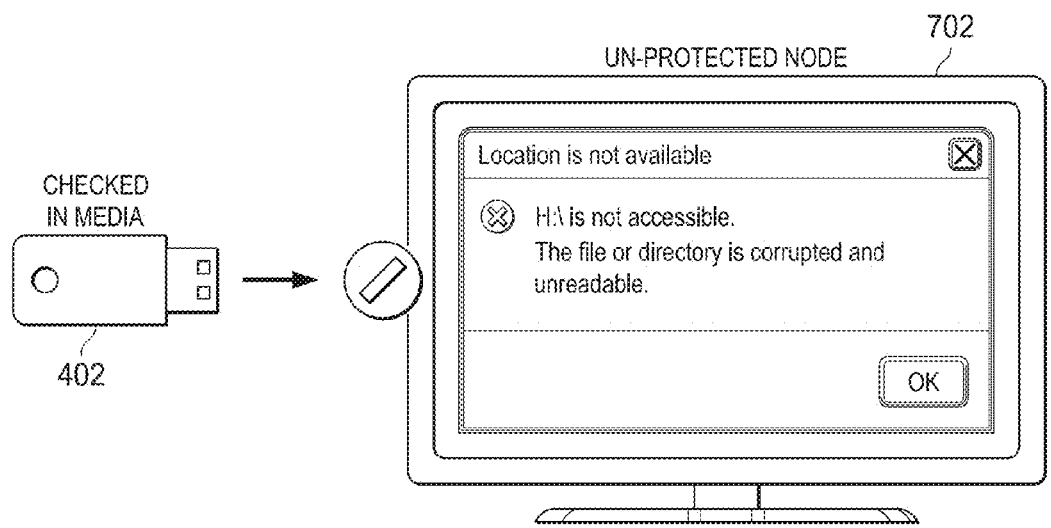

As shown in FIG. 7A, a storage device 402 cannot be used with an unprotected node 702 (a node that lacks an SMX agent 103) outside a protected system while the storage device 402 is checked-in. For example, the storage device 402 could be unrecognizable to a computing system that does not understand the file system modification that has occurred and that does not possess the necessary private key to decrypt the file system elements so that the file system is again fully functional. As a result, if a checked-in storage device 402 is connected to an unprotected node 702, the storage device 402 may be seen as unreadable and will not mount, and a user could be prompted to format the storage device 402 to make it usable. If this action is taken, all files on the storage device 402 would be destroyed, so an optional configuration parameter may allow an SMX server 105 to create an encrypted backup of a storage device's contents at the time of check-in so as to provide a recovery mechanism should this occur. For instance, the recovery mechanism could allow the SMX server 105 to restore the backed-up contents to the storage device 402.

Figure 7B:
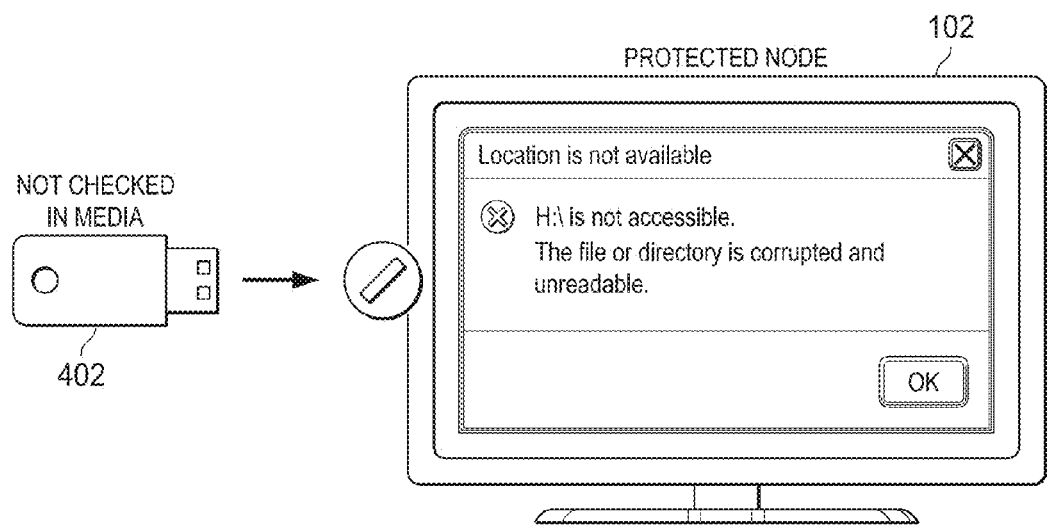

Conversely, as shown in FIG. 7B, the storage device 402 cannot be used with a protected system node 102 within a protected system if the storage device 402 is not checked-in. In some embodiments, the protection provided to the protected system node 102 by an SMX agent 103 is enforced at the kernel-level.

If a virus or other malware is introduced onto a storage device 402, the file containing the malware is not signed by the SMX server 105. The protected system node 102 is unable to access that file, hindering the functionality of the malware. If an attempt is made to attach a checked-in storage device 402 to an untrusted node in order to add malware after the storage device 402 has been scanned by the SMX server 105, the attempt fails due to the modifications to the storage device's file system. If an attempt is made to copy files from a protected system node 102 (where an SMX agent 103 is installed), the file copy may be allowed or denied by the driver depending upon the SMX agent's configuration, and the activity is written to the audit log(s) so that file exfiltration attempts can be prevented or managed.

Note that in some embodiments, the controls displayed by the SMX kiosk 104 could be disabled until a storage device 402 is inserted or otherwise coupled to the kiosk 104. Once attached, the SMX server 105 could determine whether the storage device 402 has already been checked-in. If not, the "check-in" option can be enabled, while the "check-out" option can be disabled. If so, the "check out" option can be enabled, while the "check-in" option can be disabled. Additional user interface controls could be accessible using a privileged or administrative mode of the kiosk SMX 104.

Although FIGS. 4 through 7B illustrate examples of handling removable media to support secure data transfer into and out of protected systems, various changes may be made to FIGS. 4 through 7B. For example, any suitable input mechanisms could be used with the SMX kiosks 104. Also, while the storage device 402 is shown here as a USB drive, any other suitable storage devices could be used. In addition, the form factors of the kiosk and nodes are for illustration only.

FIGS. 8 through 11 illustrate example methods supporting secure data transfer into and out of protected systems using removable media according to this disclosure. For ease of explanation, the methods shown in FIGS. 8 through 11 are described with respect to the system 100 of FIG. 1. However, the methods shown in FIGS. 8 through 11 could be used in any other suitable system, such as the system 200 of FIG. 2.

Figure 8:
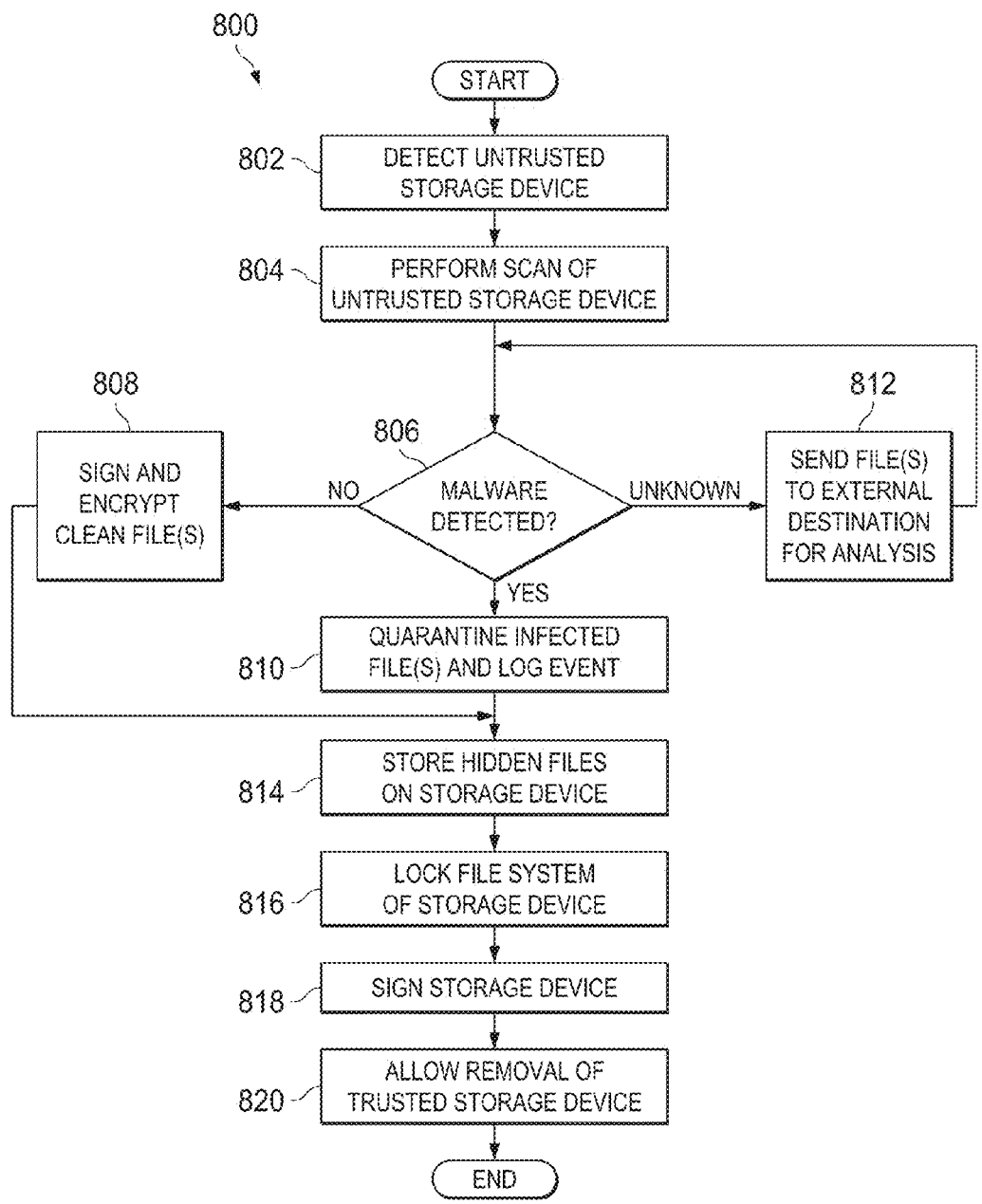
FIGS. 8 through 11 illustrate example methods supporting secure data transfer into and out of protected systems using removable media according to this disclosure.

FIG. 8 illustrates an example method 800 supporting a check-in process for removable media. The method 800 could, for example, be performed by the SMX server 105 executing on the processor 302 of the SMX kiosk 104. The check-in process allows the removable media to be used in a protected environment, such as an environment where protected nodes 102a-102n execute SMX agents 103.

As shown in FIG. 8, an untrusted storage device is detected at step 802. This could include, for example, the SMX server 105 detecting insertion or coupling of the storage device 402 in or to the removable media interface 310 of the SMX kiosk 104. This could also include the SMX server 105 examining the storage device 402 and determining that the storage device 402 lacks the contents of a checked-in device (such as a specified digital signature or a modified file system). The storage device 402 could denote any suitable device for storing data, such as a USB device, an SDHC or other Flash memory device, or other portable storage device.

A scan of the untrusted storage device occurs at step 804. This could include, for example, the SMX server 105 initiating an anti-virus or anti-malware scan of the storage device 402. The SMX server 105 could use a variety of anti-virus or anti-malware software packages, pre-defined configuration files, or manual configurations to determine which files are clean.

A determination is made whether any malware has been detected at step 806. For any file determined to be clean (lacking any malware), the clean file is digitally signed and possibly encrypted at step 808. This could include, for example, the SMX server 105 calculating a hash of each clean file and possibly using an encryption key known to the SMX agents 103 to encrypt each clean file. For any file determined to be infected (containing malware), the infected file is quarantined and the event is logged at step 810. This could include, for example, the SMX server 105 using an anti-virus or anti-malware tool to quarantine each infected file. This could also include the SMX server 105 updating a log file on the SMX kiosk 104 or on the storage device 402 to identify the malware or infected file. Any infected file is not digitally signed or encrypted.

For any "unknown" file (where a determination cannot be made that the file is clean or definitely contains malware), the file is sent to an external destination for analysis at step 812. This could include, for example, the SMX server 105 providing the file to the security manager 108 or threat analysis server 112 for analysis. As a particular example, this could include the SMX server 105 providing the file to the threat analysis server 112 for sandboxing, code analysis, reputation analysis, and behavioral analysis. Ideally, the security manager 108 or threat analysis server 112 returns an indication that the file does or does not contain malware, and the SMX server 105 performs step 808 or 810 for that file depending on the determination by the security manager 108 or threat analysis server 112. This could also include a local administrator of the SMX server 105 manually authorizing a device or file that would otherwise not be authorized by the SMX server 105 and therefore would be blocked by the SMX agents 103 (the administrative override can be logged to the audit log of the storage device 402).

Note that only the clean files are signed and possibly encrypted here, so only those files known to be clean will be accessible by the SMX agents 103. For any unknown files, the SMX server 105 can obtain information from an external source in deciding whether the files contain malware. In some embodiments, if a definitive determination cannot be made that a file is clean, the file may not be signed or encrypted in order to protect the nodes of a protected system. However, other approaches could also be used.

One or more hidden files are stored on the storage device at step 814. This could include, for example, the SMX server 105 storing one or more audit log files, one or more configurations, or one or more event logs on the storage device 402, such as in a file manifest. The file system of the storage device is locked at step 816. This could include, for example, the SMX server 105 modifying the file system of the storage device 402 in a manner recognizable by the SMX agents 103 but not by unprotected nodes. The file system of the storage device 402 could be locked in any suitable manner, such as by altering key components of the file system using a certificate or private key. The device itself can be signed at step 818. This could include, for example, the SMX server 105 digitally signing the storage device 402 itself, such as by storing a hash on the storage device 402.

At this point, removal of the storage device (now a trusted device) is allowed at step 820. This could include, for example, the SMX server 105 notifying a user that the storage device 402 has been checked-in and can be safely removed from the removable media interface 310 of the SMX kiosk 104. The trusted device can now be used with one or more protected nodes 102a-102n, and contents of the trusted device cannot be used by untrusted nodes. Thus, for instance, malware could not intentionally or unintentionally be placed onto the storage device 402 by an unprotected node 702 while the storage device 402 is checked-in.

Note that this represents one example procedure for checking-in a storage device and that additional operations could occur during the method 800 as needed or desired. For example, as noted above, only certain types of storage devices may be allowed in a protected system. In some embodiments, the SMX server 105 could determine the type of the storage device 402, such as before scanning the storage device 402 for malware. In these types of embodiments, the malware scan could be performed or the device itself could be signed only if the storage device 402 is an allowable type of device. As another example, a user could be given the option of creating an encrypted or other backup copy of the contents of the storage device 402 during check-in. The backup could be used later to restore the storage device 402 if the user inadvertently allows an unprotected node to format the storage device 402. The backup could be stored until the storage device 402 is checked out or for any other length of time.

Figure 9:
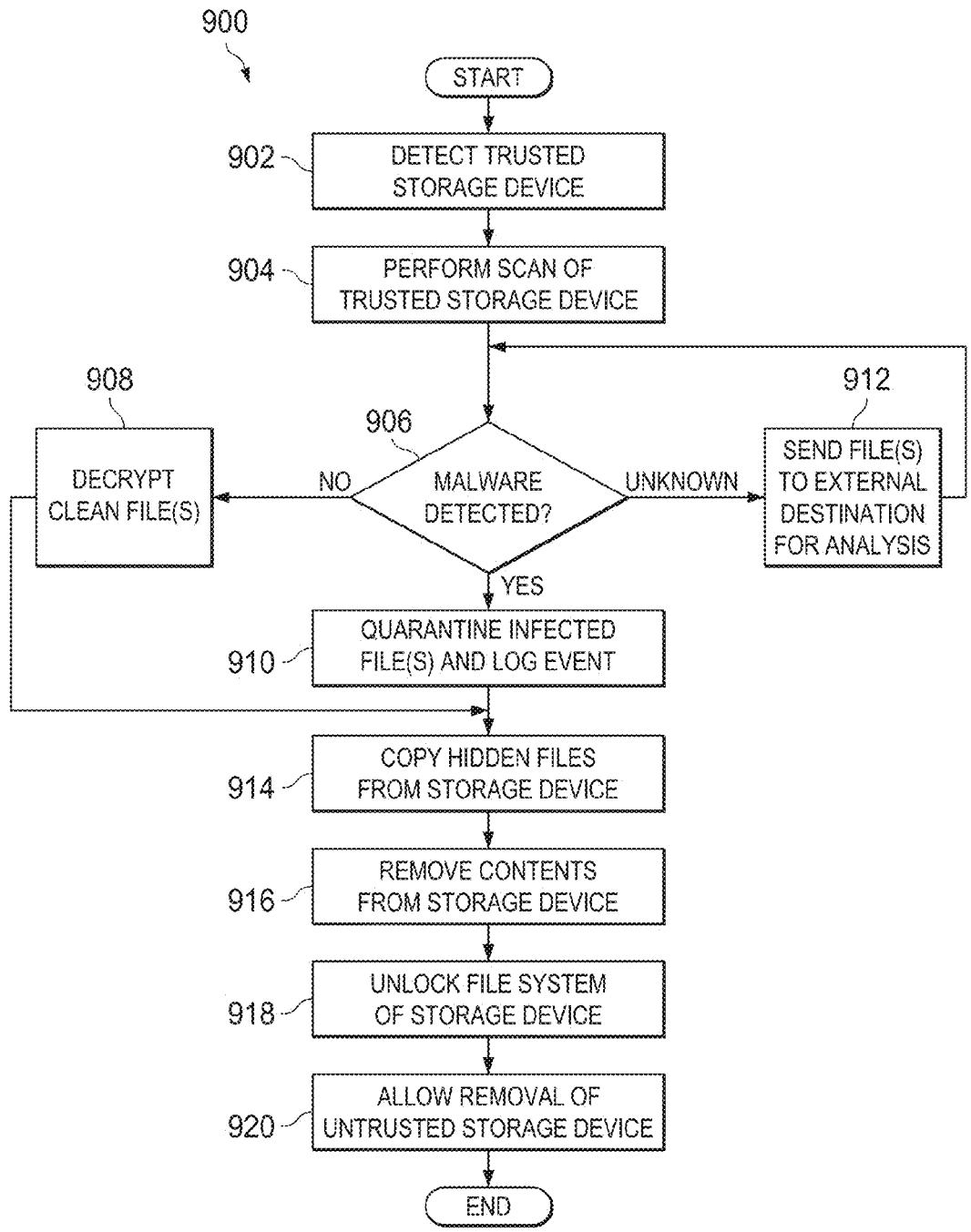

FIG. 9 illustrates an example method 900 supporting a check-out process for removable media. The method 900 could, for example, be performed by the SMX server 105 executing on the processor 302 of the SMX kiosk 104. The check-out process allows the removable media to be used in an unprotected environment, such as an environment where nodes are not protected by SMX agents 103. The checked-out removable media cannot be used in a protected environment.

As shown in FIG. 9, a trusted storage device is detected at step 902. This could include, for example, the SMX server 105 detecting insertion or coupling of the storage device 402 in or to the removable media interface 310 of the SMX kiosk 104. This could also include the SMX server 105 examining the storage device 402 and determining that the storage device 402 contains the contents of a checked-in device (such as a specified digital signature or a modified file system).

A scan of the trusted storage device occurs at step 904. This could include, for example, the SMX server 105 initiating an anti-virus or anti-malware scan for any new files added to the storage device 402 since the storage device was checked-in. The SMX server 105 could also perform an anti-virus or anti-malware scan for previously-existing files on the storage device 402, such as those that were modified since the storage device was checked-in or all files on the storage device 402. The SMX server 105 could use a variety of anti-virus or anti-malware software packages, pre-defined configuration files, or manual configurations to determine which files are clean.

A determination is made whether any malware has been detected at step 906. For any newly-added file or other file determined to be clean (lacking any malware), the clean file could optionally be decrypted (if encrypted) at step 908. For any newly-added file or other file determined to be infected (containing malware), the infected file is quarantined and the event is logged at step 910. In some embodiments, the infected file may be deleted or not be decrypted so as to stop outbound infection of unprotected nodes via the storage device 402. For any "unknown" newly-added file or other file (where a determination cannot be made that the file is clean or definitely contains malware), the file is sent to an external destination for analysis at step 912.

One or more hidden files are copied from the storage device at step 914. This could include, for example, the SMX server 105 retrieving one or more file hashes, one or more audit log files, one or more configurations, and one or more event logs from the storage device 402 and storing the data on the SMX kiosk 104. The data could also be made available to the security manager 108 or threat analysis server 112 or other component for archiving or analysis. Various contents are removed from the storage device at step 916. This could include, for example, the SMX server 105 deleting digital signatures, log files, configurations, and event logs from the storage device 402.

The file system of the storage device is unlocked at step 918. This could include, for example, the SMX server 105 modifying the file system of the storage device 402 in a manner recognizable by unprotected nodes but not by the SMX agents 103. For instance, the SMX server 105 could return the file system of a USB drive or Flash memory device to a standardized file system format so that conventional computing devices (but not protected nodes) could access and use the USB drive or Flash memory device.

At this point, removal of the storage device (now an untrusted device) is allowed at step 920. This could include, for example, the SMX server 105 notifying a user that the storage device 402 has been checked-out and can be safely removed from the removable media interface 310 of the SMX kiosk 104. The untrusted device can no longer be used with one or more protected nodes 102a-102n, and contents of the untrusted device cannot be accessed by the protected nodes 102a-102n.

Figures 10, 11:
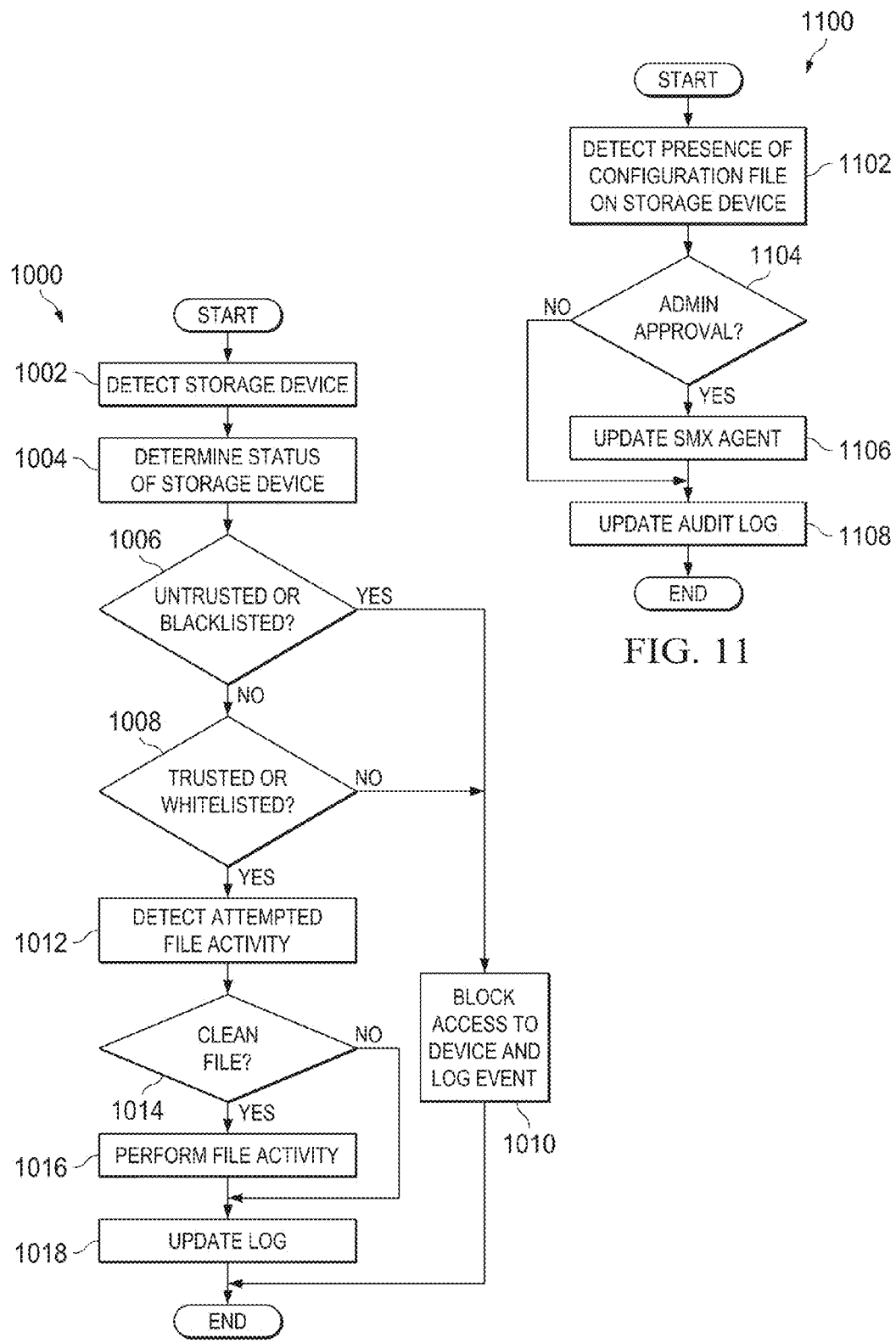

FIG. 10 illustrates an example method 1000 supporting use of removable media at a protected node. The method 1000 could, for example, be performed by the SMX agent 103 executing on the processor 302 of a protected system node 102. This process supports the use of checked-in removable media in a protected environment.

As shown in FIG. 10, a storage device is detected at step 1002. This could include, for example, the SMX server 105 detecting insertion or coupling of the storage device 402 in or to the removable media interface 310 of a protected system node 102. A status of the storage device is determined at step 1004. This could include, for example, the SMX agent 103 examining the storage device 402 and determining whether the storage device 402 contains the contents of a checked-in device (such as a specified digital signature or a modified file system). This could also include the SMX agent 103 determining whether the storage device 402 is whitelisted or blacklisted. An explanation of whitelisting and blacklisting of storage devices is provided below.

A determination is made whether the storage device is untrusted (not checked-in) or blacklisted at step 1006. Blacklisting may be desired, for instance, to prevent certain devices or types of devices from being used even if checked-in by an SMX server 105. If so, access to the storage device is blocked and the event is logged at step 1010, and the method 1000 ends. In this case, the SMX agent 103 prevents the storage device 402 from being used by the protected system node 102, helping to protect the node 102 from potential cyber-security threats associated with the storage device 402.

A determination is made whether the storage device is trusted (checked-in) or whitelisted at step 1008. Whitelisting may be desired, for instance, to allow certain devices or types of devices (like USB keyboards, USB mice, biometric devices, or security keys) to be used without requiring check-in. If not, access to the storage device is blocked and the event is logged at step 1010, and the method 1000 ends.

In that case, the SMX agent 103 cannot tell the status of the storage device 402, so the SMX agent 103 blocks usage of the storage device 402. Again, this may help to prevent the storage device 402 from being used by the protected system node 102 in order to protect the node 102. In some embodiments, the system can be configured to disable USB devices or other devices by default to minimize an attacker's ability to bypass the control mechanisms using an unexpected device type, such as USB-based microprocessors (also called "rubber duckies").

If the storage device is trusted or whitelisted, the SMX agent 103 allows usage of the storage device 402, and attempted file activity is detected at step 1012. This could include, for example, the SMX agent 103 detecting that the protected system node 102 is attempting to access or copy a file stored on the storage device 402. If so, the SMX agent determines whether the file is a clean file at step 1014. This could include, for example, the SMX agent 103 determining whether the file is digitally signed and possibly encrypted as expected, such as by verifying whether the file has a current hash value that matches a prior hash value stored in a hidden file. If not, access to the file is blocked, and the requested file activity does not occur and could be logged. If so, access to the file is permitted, and the desired file activity occurs at step 1016. Once the file activity occurs or if the file activity is blocked, the audit log is updated at step 1018. This could include, for example, the SMX agent 103 updating the audit log on the storage device 402 with information related to the action(s) being performed.

Note that steps 1012-1018 could be performed any number of times as files on the storage device 402 are accessed or copied and as new files are added to the storage device 402. When the storage device 402 is later coupled to an SMX kiosk 104 for check-out, the audit log(s) on the storage device 402 can be retrieved by the SMX server 105 and sent to the security manager 108 or other devices or systems, such as via one or more secure network connections. Examples of other devices or systems can include log collection and analysis tools designed for use within a particular protected system. One specific example can include sending audit logs within an industrial automation and control system to a HONEYWELL RISK MANAGER, where threat intelligence and audit activities provided by the logs can be translated into indicators of cyber-security risks.

Also note that whitelisting and blacklisting of devices or device types could occur in any suitable manner. For example, each SMX agent 103 could support an administrative action that configures the SMX agent during initial deployment in order to identify a device type, model, vendor, brand, or other identifying parameter(s). Devices or device types could be defined generally (such as "keyboards") or specifically (such as by specific USB or other device identifiers, vendor identifiers, serial numbers, or other suitable identifiers). A whitelist or blacklist can denote a structured file that is encrypted, signed, and stored securely on a protected node. The SMX agent 103 could also support a mechanism by which an administrative override may be given after initial deployment (which is described in FIG. 11), allowing the whitelist or blacklist to be altered as needed or desired.

In addition, note that whitelists and blacklists could be used in various ways by SMX agents 103 to support the use of peripheral devices. For example, in some embodiments, a whitelist or blacklist can be encrypted and digitally signed, such as with a hash value. An SMX agent 103 can verify the hash value and decrypt the whitelist or blacklist, and the contents of the whitelist or blacklist could be loaded into one or more filters upon successful verification and decryption. When a peripheral device is coupled to a protected node 102, the SMX agent 103 can compare one or more device parameters from the peripheral device to device parameters in the one or more filters in order to determine whether the peripheral device is allowed or blocked. Of course, other approaches for using the whitelists and blacklists could also be used.

Depending on the implementation, it may be desired or required to provide some sort of agent-side management for whitelists and blacklists that are used by SMX agents 103. This may allow, for example, an administrator or other user to authorize the use of a specific whitelist or blacklist by an SMX agent 103. In some embodiments, the SMX agent 103 could require suitable authorization from an administrator or other user before allowing use of a specific whitelist or blacklist. In particular embodiments, the specific whitelist or blacklist could be digitally signed (such as with a hash value) by the SMX agent 103 after receiving appropriate authorization from the user. The SMX agent 103 could later use the digital signature when accessing a whitelist or blacklist to verify that the list has not been illicitly modified.

FIG. 11 illustrates an example method 1100 for configuring or updating an SMX agent. The method 1100 could, for example, be performed by the SMX agent 103 after the SMX agent 103 determines in step 1008 that a storage device 402 is a trusted or whitelisted storage device. This process supports changing the operation of the SMX agent 103 after the SMX agent 103 has been deployed in a protected environment.

As shown in FIG. 11, the presence of a configuration file is detected on a trusted storage device at step 1102. This could include, for example, the SMX agent 103 determining that a properly encrypted and signed configuration file is present on a trusted storage device 402, such as in a file manifest. A determination is made whether an administrator or other user approves updating or configuring the SMX agent using the configuration file at step 1104. This could include, for example, the SMX agent 103 presenting a prompt on the screen of the protected node 102.

Assuming the administrator or other user approves, the SMX agent is updated using the configuration file at step 1106. This could include, for example, the SMX agent 103 updating one or more of its own parameters or operational characteristics using the contents of the configuration file. As a particular example, this could include the SMX agent 103 updating one or more whitelists, one or more blacklists, one or more certificates or private keys, or other data used by the SMX agent 103. An audit log on the storage device is updated at step 1108. This could include, for example, the SMX agent 103 updating one or more audit logs on the storage device 402 to identify the configuration change being implemented by the SMX agent 103.

The configuration file can be used here to override or update a setting of the SMX agent 103 after initial deployment of the SMX agent 103. For example, if an administrator wants to add a new device or device type to a whitelist or blacklist, the configuration file can be used to update the whitelist or blacklist of the SMX agent 103 with the new device or device type. This allows the operation of the SMX agent 103 to be updated without having to change the actual driver implementing the SMX agent 103. Note that the override or update to the setting(s) of the SMX agent 103 could permanently override or update the setting(s) of the SMX agent 103, or the override or update could denote a one-time or other limited-time override or update (such as when the override or update occurs only for this particular storage device 402). Of course, other mechanisms could also be used to override or update an SMX agent 103.

Note that this approach for supporting the override or update of SMX agent settings can support additional security mechanisms at the local protected node 102 in order to prevent the configuration mechanism from being used as an attack vector. For example, additional checksums may be used by the SMX agents 103 to prevent illicit modification of whitelists, blacklists, or other SMX agent settings.

Although FIGS. 8 through 11 illustrate examples of methods supporting secure data transfer into and out of protected systems using removable media, various changes may be made to FIGS. 8 through 11. For example, various steps in each figure could overlap, occur in parallel, occur in a different order, or occur any number of times.

Figure 12:
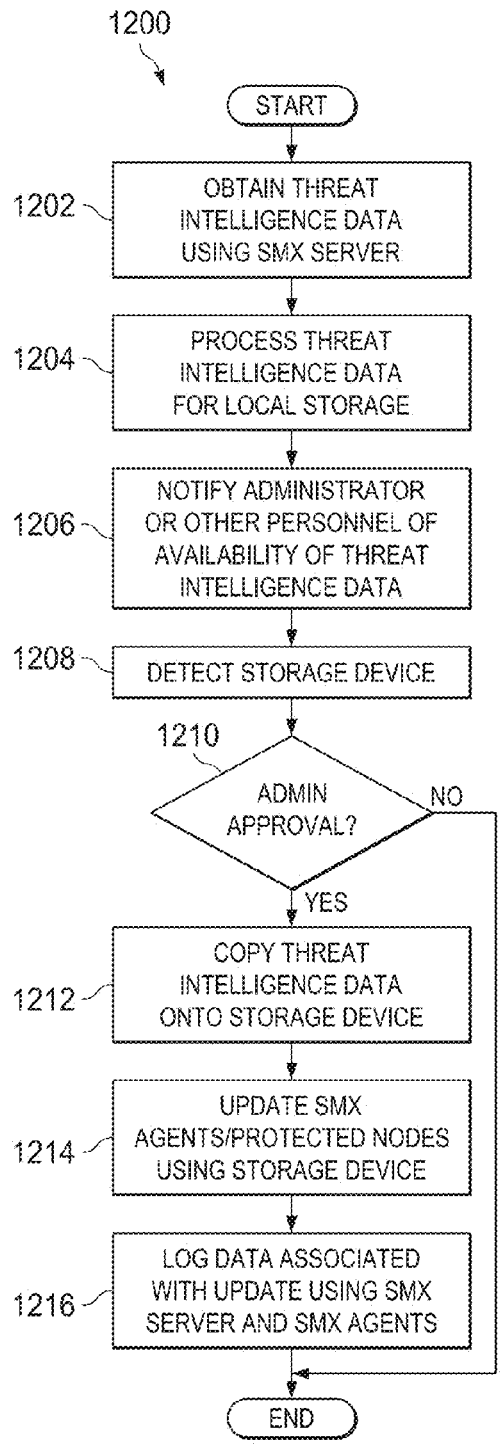
FIGS. 12 and 13 illustrate example methods supporting applications that involve secure data transfer into and out of protected systems using removable media according to this disclosure.
Figure 13:
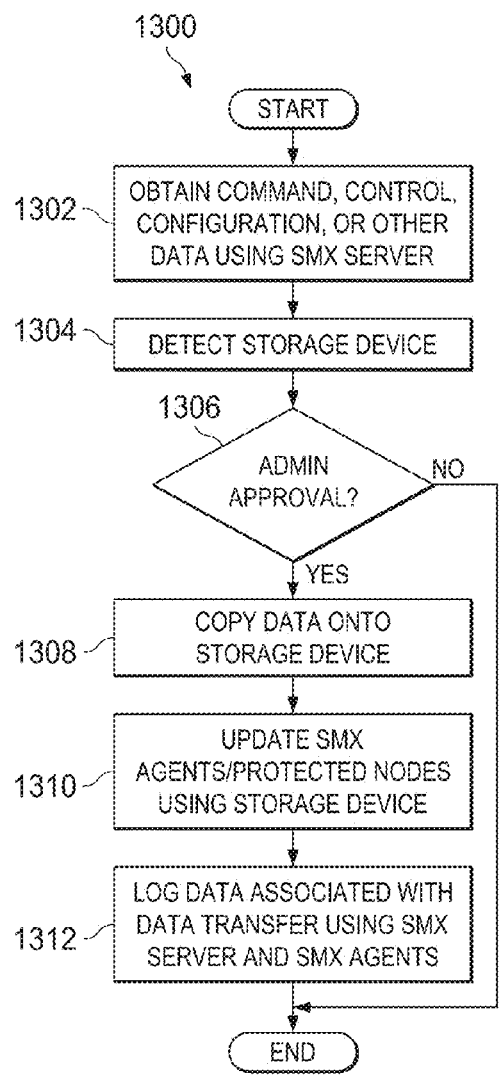

FIGS. 12 and 13 illustrate example methods supporting applications that involve secure data transfer into and out of protected systems using removable media according to this disclosure. For ease of explanation, the methods shown in FIGS. 12 and 13 are described with respect to the system 100 of FIG. 1. However, the methods shown in FIGS. 12 and 13 could be used in any other suitable system, such as the system 200 of FIG. 2.

One problem often experienced with protected systems is that it is difficult to move valid data or files into and out of the protected systems. For example, protected systems are often isolated from external networks such as the Internet, which can make it difficult to update applications executed by the protected system nodes 102a-102n with application patches or other information. As a particular example, it can be very difficult to keep anti-virus or anti-malware applications on protected system nodes 102a-102n up to date with the latest threat intelligence.

One example use of a storage device 402 in a system such as the ones shown in FIGS. 1 and 2 involves providing threat intelligence (such as reputation feeds, malware signature updates, and cloud-based threat sandboxing technologies) to protected systems. Ordinarily, threat intelligence is difficult to provide to a protected system. Threat intelligence typically depends on continuous Internet access, which the protected system often does not have.

FIG. 12 illustrates an example method 1200 for secure data transfer of threat intelligence into protected systems using removable media. The method 1200 could, for example, be performed using the storage device 402 along with an SMX server 105 and SMX agents 103. This process allows threat intelligence to be securely provided to protected nodes 102a-102n in a protected environment.

As shown in FIG. 12, threat intelligence data is obtained using an SMX server at step 1202. This may include, for example, one or more SMX servers 105 supporting scheduled or manual downloads to obtain needed threat intelligence from one or more external sources. Because the SMX server 105 can be located outside of a system being protected, the SMX server 105 can be connected directly to one or more threat intelligence sources, such as HONEYWELL's MANAGED SECURITY SERVICES CENTER (MSSC), HONEYWELL's INDUSTRIAL CYBER SECURITY LABORATORY, anti-virus update servers, cloud threat services, or commercial threat intelligence feeds. Using a secure network connection such as a Virtual Private Network (VPN) connection, the SMX server 105 can download data updates according to its specific configuration and store the data in a unique directory in its local file system.

The collected threat intelligence data is processed for local storage by the SMX server at step 1204. This could include, for example, the SMX server 105 performing a series of tasks, such as checking existing file hashes to determine if files are trusted, scanning untrusted files to ensure that they are not malicious, and signing files (once validated) to ensure that they are not modified after they have been scanned. The series of tasks could also include packaging files locally to preserve space, creating a configuration notification message to update the SMX agents 103, and tracking access to packaged update files locally. The SMX server 105 here can use local file scanning and checksums to ensure that downloaded information is not itself corrupt or infected with malware. In addition, the SMX server 105 here could use a tracking table or database to log which files are available, when the files became available, when the files were copied into a protected system, what protected nodes received the files, and who copied the files to the protected nodes.

An administrator or other personnel are notified about the availability of the threat intelligence data at step 1206. This could include, for example, the SMX server 105 notifying an administrator that one or more updates are available. This could be done in any suitable manner, such as via email or text message. An administrator could also be notified via a notification message inserted onto a storage device 402 by the SMX server 105. When that storage device 402 is connected to a protected system node 102, the SMX agent 103 on the protected system node 102 could identify the notification message and transmit a notification to the security manager 108, threat analysis server 112, or other destination(s). The notification can identify the availability of an update.

However notified, an administrator or other personnel can connect a storage device to the SMX server and gain access to the validated files, and the storage device is detected at step 1208. This could include, for example, the SMX server 105 detecting insertion or coupling of a storage device 402 in or to the removable media interface 310 of the SMX kiosk 104. Assuming the copying of the validated files is approved at step 1210 (such as via the display of the SMX kiosk 104), the threat intelligence data is copied onto the storage device at step 1212. This could include, for example, the SMX server 105 copying one or more validated files containing threat intelligence data onto the storage device 402. The validated files can be digitally signed and encrypted so that they appear as valid files to the SMX agents 103.

Once the storage device is checked-in, the storage device is used to update the protected nodes or SMX agents at step 1214. This could include, for example, the personnel carrying the storage device 402 safely into a protected system. This could also include the personnel using the storage device 402 to update the SMX agents 103 of the protected system nodes 102. The SMX agents 103 could be updated with the threat intelligence data in the same or similar manner as shown in FIG. 11 and described above.

Data associated with the update is logged using the SMX server and the SMX agents at step 1216. This could include, for example, using the auditing capabilities of the SMX servers 105 and the SMX agents 103 to document the updates of the protected system nodes 102 within the protected system. For instance, when the storage device 402 containing the threat intelligence data is checked-out, the SMX server 105 can use the audit logs of the storage device 402 to identify which protected nodes were updated. This information could also be used in any other suitable manner, such as for internal auditing to support compliance efforts or to be utilized within broader monitoring and analytics platforms like HONEYWELL RISK MANAGER.

In this way, threat intelligence data can be securely stored on a checked-in storage device 402, and the checked-in storage device 402 is used to transport the threat intelligence data to at least one protected system node. Since the storage device 402 has undergone the check-in procedure, there is little or no risk of the storage device 402 containing malware that would infect the at least one protected system node. As a result, the threat intelligence data can be provided to the protected system node(s) in a safe and secure manner. Depending on the implementation of the SMX agents, the protected system nodes, or the protected system, the personnel might need to update each protected system node individually, or one or a subset of the protected system nodes could be updated and then provide the update data to other protected system nodes.

The same approach can be used to provide any suitable data to protected nodes in a protected system. For example, when normal network access is highly controlled, it is difficult to maintain management communication between applications and services located outside of the protected system and those located inside of the protected system. The approach described above allows storage devices 402 to be used to transfer command, control, or configuration parameters or other data in a safe manner.

FIG. 13 illustrates an example method 1300 for secure data transfer of data into protected systems using removable media. The method 1300 could, for example, be performed using the storage device 402 along with an SMX server 105 and SMX agents 103. This process allows command, control, or configuration parameters or other data to be securely provided to protected nodes 102a-102n in a protected environment.

As shown in FIG. 13, command, control, or configuration parameters or other data is obtained using an SMX server at step 1302. This may include, for example, one or more SMX servers 105 automatically obtaining the data from any suitable source(s). The data could also be obtained manually, such as when an administrator or other personnel provide the data to the SMX servers 105 via a storage device 402 or identify one or more network locations from which the data is to be obtained. Although not shown here, the SMX server 105 could scan the data to ensure that no malware is present, digitally sign the data files containing the data, and perform other functions such as those described above with respect to FIG. 12.

An administrator or other personnel can connect a storage device to the SMX server, which is detected at step 1304. This could include, for example, the SMX server 105 detecting insertion or coupling of a storage device 402 in or to the removable media interface 310 of the SMX kiosk 104. Assuming the copying of the data is approved at step 1306 (such as via the display of the SMX kiosk 104), the data is copied onto the storage device 402 at step 1308. This could include, for example, the SMX server 105 copying one or more data files containing the data onto the storage device 402. The data files can be digitally signed and encrypted so that they appear as valid files to the SMX agents 103.

Once the storage device is checked-in, the storage device is used to update the protected nodes or SMX agents at step 1310. This could include, for example, the personnel carrying the storage device 402 safely into a protected system. This could also include the personnel using the storage device 402 to update the SMX agents 103, other applications, or other components of the protected system nodes 102. The SMX agents 103, other applications, or other components could be updated with the data in the same or similar manner as shown in FIG. 11 and described above.

Data associated with the update is logged using the SMX server and the SMX agents at step 1312. This could include, for example, using the auditing capabilities of the SMX servers 105 and the SMX agents 103 to document the updates of the protected system nodes 102 within the protected system. For instance, when the storage device 402 is checked-out, the SMX server 105 can use the audit logs of the storage device 402 to identify which protected nodes received the data. This information could also be used in any other suitable manner, such as for internal auditing to support compliance efforts or to be utilized within broader monitoring and analytics platforms like HONEYWELL RISK MANAGER.

This approach does not introduce new security threats and forms part of a larger secure information transfer system. The information being transported on the storage devices 402 can be strongly encrypted so that it cannot be easily intercepted and manipulated by unauthorized actors. To support this transfer, management parameters (such as configuration options, commands, or other data) or other information can be sent from an SMX server 105 to one or more protected nodes having the SMX agents 103. These components support the use of protected removable media or modified file sharing to transfer the management parameters or other information between the SMX server 105 and the SMX agents 103.

Although FIGS. 12 and 13 illustrate examples of methods supporting applications that involve secure data transfer into and out of protected systems using removable media, various changes may be made to FIGS. 12 and 13. For example, various steps in each figure could overlap, occur in parallel, occur in a different order, or occur any number of times. Also, FIGS. 12 and 13 represent two example applications in which secure data transfers can occur using removable media. However, the mechanisms for secure data transfers into and out of protected systems described in this patent document could be used to support any other or additional data transfers.

Among other things, the systems, devices, and techniques described in this patent document support the following features, which can be used individually or in any suitable combination:

the ability to control how files are moved into and out of a protected system over removable media so that there is some assurance that the files are "safe" (not infected with computer viruses or other malware) and are "authorized" (allowed and intended to be transferred into or out of a secure network);

the ability to control what removable media are allowed within a protected system and to help ensure that media are used only for intended purposes;

the ability to "check in" removable media in order to (i) ensure that each is an authorized device, (ii) ensure that each is accessible to computers utilizing an SMX agent, and (iii) ensure that each is not then used for other purposes until such time as it is "checked out";

the ability to control which files are determined to be "safe" and therefore allowed to be transferred to a protected node within a protected system;

the ability to ensure that only files that are authorized are allowed to be copied onto, executed by, or otherwise used by a protected node within a protected system;

the ability to whitelist certain devices or types of devices (such as USB keyboards, USB mice, biometric devices, or security keys) so that such devices can be used without requiring check-in;

the ability to blacklist certain devices or types of devices so that such devices cannot be used even if checked-in;

the ability to introduce threat intelligence updates into a protected system using secure storage devices;

the ability to transfer management parameters or other data between devices in a secure manner; and the ability to audit which files are introduced to which nodes within a protected system via removable media, including pertinent details of the file I/O (such as the active user, date, time, source file and target system information).

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(1) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
    at least one interface configured to be coupled to a storage device; and
    at least one processing device configured to:
        detect the storage device;
        determine whether the storage device has been checked-in for use with at least the apparatus;
        grant access to the storage device in response to determining that the storage device has been checked-in for use with at least the apparatus;
        block access to the storage device in response to determining that the storage device has not been checked-in for use with at least the apparatus;
        after granting access to the storage device, determine whether a file on the storage device has been checked-in for use with at least the apparatus;
        grant meaningful access to the file on the storage device in response to determining that the file has been checked-in for use with at least the apparatus; and
        block meaningful access to the file on the storage device in response to determining that the file has not been checked-in for use with at least the apparatus;
    wherein, to determine whether the storage device has been checked-in, the at least one processing device is configured to determine whether at least one component of a file system of the storage device has been modified using an encryption method and a locally-stored certificate or private key; and
    wherein, when the at least one component of the file system of the storage device has been modified using the encryption method and the locally-stored certificate or private key, nodes outside of a protected system cannot recognize the file system of the storage device.

2. The apparatus of claim 1, wherein, to determine whether the storage device has been checked-in, the at least one processing device is further configured to determine whether the storage device has an expected digital signature.

3. The apparatus of claim 1, wherein, to determine whether the file has been checked-in, the at least one processing device is configured to at least one of:
    determine whether the file has an expected digital signature; and
    determine whether the file is encrypted in an expected manner.

4. The apparatus of claim 3, wherein, to determine whether the file has the expected digital signature, the at least one processing device is configured to determine whether the file has a hash value that matches an expected hash value.

5. The apparatus of claim 1, wherein:
    the at least one processing device is further configured to log information identifying one or more activities involving the storage device on the storage device; and
    the logged information includes at least one of: information about one or more files on the storage device and information about one or more events involving the storage device.

6. The apparatus of claim 1, wherein:
    the at least one processing device is configured to execute an agent that is configured to control access to the storage device; and
    the agent is configured to operate as a kernel-level driver or in kernel mode and is configured to intercept attempts to connect the storage device to the apparatus.

7. The apparatus of claim 1, wherein the storage device comprises a USB drive.

8. A method comprising:
    detecting a storage device at a protected node;
    determining whether the storage device has been checked-in for use with at least the protected node;
    granting access to the storage device in response to determining that the storage device has been checked-in for use with at least the protected node;
    blocking access to the storage device in response to determining that the storage device has not been checked-in for use with at least the protected node;
    after granting access to the storage device, determining whether a file on the storage device has been checked-in for use with at least the protected node;
    granting meaningful access to the file on the storage device in response to determining that the file has been checked-in for use with at least the protected node; and
    blocking meaningful access to the file on the storage device in response to determining that the file has not been checked-in for use with at least the protected node;
    wherein determining whether the storage device has been checked-in comprises determining whether at least one component of a file system of the storage device has been modified using an encryption method and a locally-stored certificate or private key; and
    wherein, when the at least one component of the file system of the storage device has been modified using the encryption method and the locally-stored certificate or private key, nodes outside of a protected system cannot recognize the file system of the storage device.

9. The method of claim 8, wherein determining whether the storage device has been checked-in further comprises determining whether the storage device has an expected digital signature.

10. The method of claim 8, wherein determining whether the file has been checked-in comprises at least one of:
    determining whether the file has an expected digital signature; and
    determining whether the file is encrypted in an expected manner.

11. The method of claim 8, further comprising:
    logging information identifying one or more activities involving the storage device on the storage device;
    wherein the logged information includes at least one of: information about one or more files on the storage device and information about one or more events involving the storage device.

12. The method of claim 8, wherein:
    the detecting, determining, granting, and blocking are performed by an agent executed by the protected node, the agent configured to control access to the storage device; and the agent is configured to operate as a kernel-level driver or in kernel mode and is configured to intercept attempts to connect the storage device to the protected node.

13. The method of claim 8, further comprising:
storing, by the protected node, one or more new files on the storage device; and
logging information identifying file activity associated with the one or more new files on the storage device.

14. The method of claim 8, wherein, when the file system of the storage device has not been modified in an expected manner, nodes within the protected system including the protected node cannot recognize the file system of the storage device.

15. The method of claim 8, wherein the protected node is configured to perform functions related to industrial process control in an industrial process control and automation system.

16. The method of claim 8, wherein the storage device comprises a USB drive.

17. A non-transitory computer readable medium containing instructions that, when executed by at least one processing device, cause the at least one processing device to:
detect a storage device at a protected node;
determine whether the storage device has been checked-in for use with at least the protected node;
grant access to the storage device in response to determining that the storage device has been checked-in for use with at least the protected node;
block access to the storage device in response to determining that the storage device has not been checked-in for use with at least the protected node;
after granting access to the storage device, determine whether a file on the storage device has been checked-in for use with at least the protected node;
grant meaningful access to the file on the storage device in response to determining that the file has been checked-in for use with at least the protected node; and
block meaningful access to the file on the storage device in response to determining that the file has not been checked-in for use with at least the protected node;
wherein the instructions that when executed cause the at least one processing device to determine whether the storage device has been checked-in comprise:
instructions that when executed cause the at least one processing device to determine whether at least one component of a file system of the storage device has been modified using an encryption method and a locally-stored certificate or private key; and
wherein, when the at least one component of the file system of the storage device has been modified using the encryption method and the locally-stored certificate or private key, nodes outside of a protected system cannot recognize the file system of the storage device.

18. The non-transitory computer readable medium of claim 17, wherein the instructions that when executed cause the at least one processing device to determine whether the storage device has been checked-in further comprise:
instructions that when executed cause the at least one processing device to determine whether the storage device has an expected digital signature.

19. The non-transitory computer readable medium of claim 17, wherein the instructions that when executed cause the at least one processing device to determine whether the file has been checked-in comprise:
instructions that when executed cause the at least one processing device to at least one of:
determine whether the file has an expected digital signature; and
determine whether the file is encrypted in an expected manner.

20. The non-transitory computer readable medium of claim 17, further containing instructions that when executed cause the at least one processing device to:
log information identifying one or more activities involving the storage device on the storage device;
wherein the logged information includes at least one of: information about one or more files on the storage device and information about one or more events involving the storage device.

21. The non-transitory computer readable medium of claim 17, wherein the instructions implement an agent that is configured to control access to the storage device; and
wherein the agent is configured to operate as a kernel-level driver or in kernel mode and is configured to intercept attempts to connect the storage device to the protected node.

22. The non-transitory computer readable medium of claim 17, wherein the storage device comprises a USB drive.

* * * * *